(12) United States Patent
Advincula et al.

(10) Patent No.: US 11,364,656 B2
(45) Date of Patent: Jun. 21, 2022

(54) MULTILAYER POLYMER COMPOSITE CONSTRUCTS

(71) Applicant: CASE WESTERN RESERVE UNIVERSITY, Cleveland, OH (US)

(72) Inventors: Rigoberto Advincula, Shaker Heighls, OH (US); Pengfei Chao, Cleveland, OH (US); Eric Baer, Cleveland Heights, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 288 days.

(21) Appl. No.: 16/503,848

(22) Filed: Jul. 5, 2019

(65) Prior Publication Data
US 2020/0316818 A1    Oct. 8, 2020

Related U.S. Application Data

(60) Provisional application No. 62/694,347, filed on Jul. 5, 2018.

(51) Int. Cl.
  *B29B 9/04*      (2006.01)
  *B32B 27/08*     (2006.01)
  (Continued)

(52) U.S. Cl.
  CPC ...... *B29B 9/04* (2013.01); *B01J 2/20* (2013.01); *B29B 9/12* (2013.01); *B29B 9/16* (2013.01);
  (Continued)

(58) Field of Classification Search
  CPC ........ B01J 2/20; B29B 2009/161; B29B 9/04; B29B 9/12; B29B 9/16; B32B 2250/03; B32B 2250/04; B32B 2250/05; B32B 2250/24; B32B 2270/00; B32B 2307/54; B32B 2307/558; B32B 2307/704; B32B 2307/7163; B32B 2307/728; B32B 2307/73; B32B 2307/732; B32B 23/04; B32B 23/08; B32B 2410/00; B32B 2535/00; B32B 2555/00; B32B 27/08; B32B 27/18; B32B 27/24; B32B 27/28; B32B 27/281; B32B 27/285;
  (Continued)

(56) References Cited

U.S. PATENT DOCUMENTS

| | | | | |
|---|---|---|---|---|
| 2008/0026040 | A1* | 1/2008 | Farr | A61K 31/18 424/443 |
| 2009/0136549 | A1* | 5/2009 | Lin | A61P 25/24 424/400 |
| 2013/0291729 | A1* | 11/2013 | Baer | B29C 48/08 96/12 |

OTHER PUBLICATIONS

Wang, et al. "Manufacturing of polymer continuous nanofibers using a novel co-extrusion and multiplication technique" Polymer 55 (2014) 673-685.
(Continued)

*Primary Examiner* — Frances Tischler
(74) *Attorney, Agent, or Firm* — Tarolli, Sundheim, Covell & Tummino LLP

(57) ABSTRACT

A method of forming particles for controlled guest agent release includes coextruding first and second polymer materials to form a multilayer polymer composite sheet comprising alternating first and second polymer layers, dividing the multilayer sheet into particles, immersing the particles in a solvent containing the guest agent such that the first layers swell and the guest agent is loaded into the swollen first layers.

18 Claims, 26 Drawing Sheets

(51) Int. Cl.
  B29B 9/12    (2006.01)
  B32B 27/24   (2006.01)
  B29B 9/16    (2006.01)
  B01J 2/20    (2006.01)
(52) U.S. Cl.
  CPC .............. B32B 27/08 (2013.01); B32B 27/24 (2013.01); *B29B 2009/161* (2013.01); *B32B 2250/24* (2013.01)
(58) Field of Classification Search
  CPC ... B32B 27/286; B32B 27/302; B32B 27/304; B32B 27/306; B32B 27/308; B32B 27/32; B32B 27/322; B32B 27/34; B32B 27/36; B32B 27/365
  See application file for complete search history.

(56) References Cited

OTHER PUBLICATIONS

Balakrishnan, et al. "Star poly(E-caprolactone)-based electrospun fibers as biocompatible scaffold for doxorubicin with prolonged drug release activity" Colloids and Surfaces B: Biointerfaces 161 (2018) 488-496.

Bhattacharya, et al. "Biodegradable Copolymer for Stimuli-Responsive Sustained Release of Doxorubicin" ACS Publications, ACS Omega 2016, 1, 108-117.

Gao, et al. "Preparation, characterization and application of star-shaped PCL/PEG micelles for the delivery of doxorubicin in the treatment of colon cancer" Dove Press Journal, International Journal of Nanomedicine, Mar. 7, 2013, pp. 971-982.

Hira, et al. "Targeted Delivery of Doxorubicin-Loaded Poly (e-caprolactone)-b-Poly (N-vinylpyrrolidone) Micelles Enhances Antitumor Effect in Lymphoma" PLoS One, Apr. 2014, vol. 9, Issue 4, e94309, pp. 1-17.

Jordan, et al. "Reducing Environmental Impact: Solvent and PEG Reclamation During Production of Melt-Extruded PCL Nanofibers" ACS Sustainable Chem. Eng. 2015, 3, 11, 2994-3003, Publication Date: Oct. 14, 2015, https://doi.org/10.1021/acssuschemeng.5b01019.

Kim, et al. "Surface Modification of Melt Extruded Poly(e-caprolactone) Nanofibers: Toward a New Scalable Biomaterial Scaffold" ACS Publications, dx.doi.org/10.1021/mz500112d | ACS Macro Lett. 2014, 3, 585-589.

Malikmammadov, et al. "PCL and PCL-Based Materials in Biomedical Applications", Journal of Biomaterials Science, Polymer Edition, 29:7-9, 863-893, DOI: 10.1080/09205063.2017.1394711, 2018.

* cited by examiner

A

B

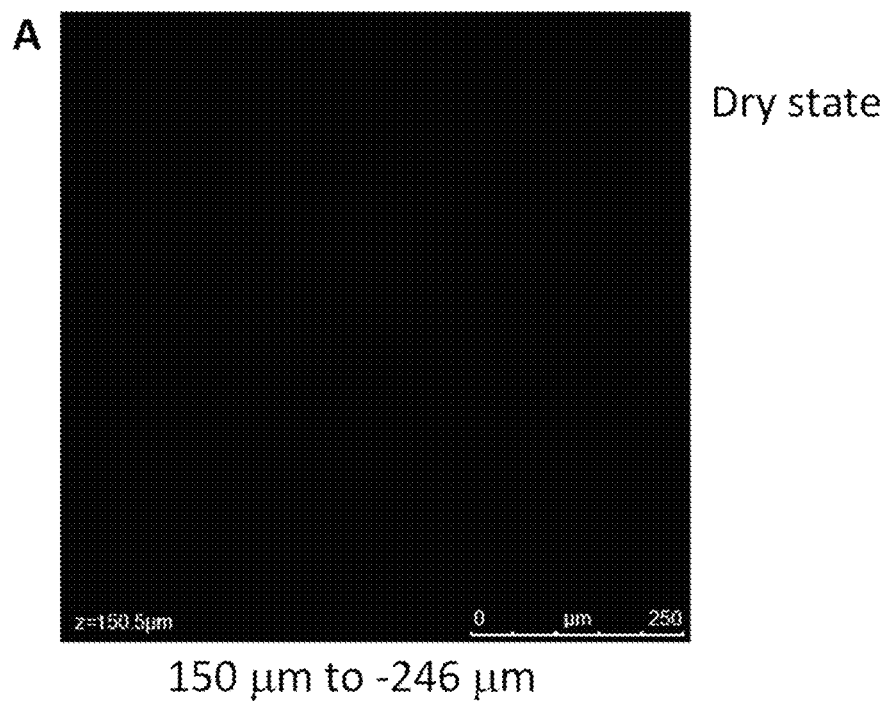
150 μm to -246 μm
Fig. 9A
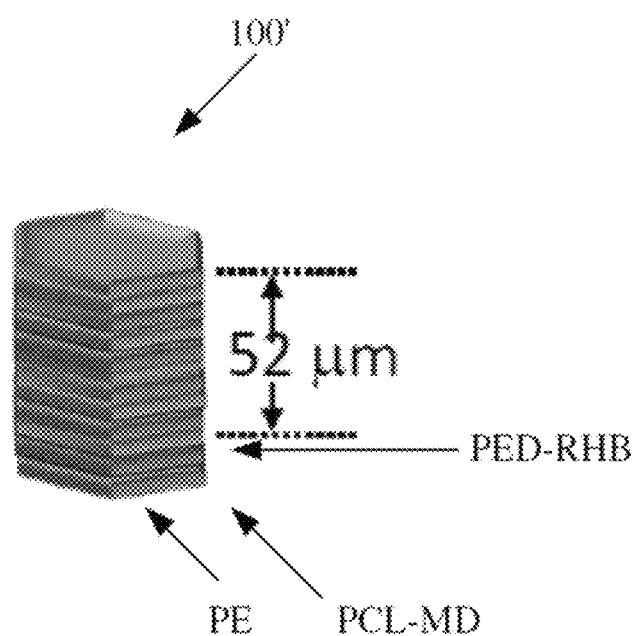
Fig. 9A (labels: 100', 52 μm, PED-RHB, PE, PCL-MD)

A

Multilayered Microparticle loaded with Oil Red

B

Multilayered Microparticle loaded with Nile Red

Before Curcumin Loading

A (i) (ii)

(iii)

Confocal microscopy of multilayer microparticle before loading with DOX

Confocal microscopy of multilayer microparticle after loading with DOX

Z-scan of Confocal microscopy of multilayer micro-particle after loading with DOX Fluorescence intensity of z scanning by confocal microscopy of multilayer micro-particle after loading with DOX

MULTILAYER POLYMER COMPOSITE CONSTRUCTS

RELATED APPLICATION

This application claims priority from U.S. Provisional Application No. 62/694,347, filed Jul. 5, 2018, the subject matter of which is incorporated herein by reference in its entirety.

TECHNICAL FIELD

This application relates to extruded polymers and, more specifically, relates to a multilayer polymer construct for encapsulating and releasing a guest agent in a controlled manner.

BACKGROUND

Controlled release systems have been widely used in different areas. In agriculture, the controlled release of fertilizer was developed in the 1970s, where sustained and controlled delivery of nutrients following a single application to the soil. In some personal care products, vitamin C and insect repellent lotion can be released in a sustainable manner. The main application of the controlled release system is in drug release, especially controlled anticancer drug release.

In the last two decades, rapid advances of nanotechnology catalyzed the transformation of controlled release systems, especially controlled drug delivery, from macro-scale devices to micro and nano-scale systems. To cater to specific needs, the current controlled release systems are mainly polymer-based nano-carriers, in which polymeric nanoparticle and liposomes are dominantly studied. Belonging to synthetic polyester family, poly($\varepsilon$-caprolactone) (PCL) is widely used for various biomedical applications due to its good biocompatibility and slow degradation in aqueous environment. Because of the high permeability derived from the rubbery characteristics of PCL, it has been extensively exploited for encapsulation and release of low molecular weight drugs, such as vaccines, steroids and doxorubicin. Due to the hydrophobic and semi-crystalline nature, only the nano-sized PCL devices are used as delivery system, such as nano-micelles, nano-vesicles and nano-fibers. However, these PCL based nano-devices are rarely employed for industrial applications because of the difficulties in large-scale fabrication.

SUMMARY

Embodiments described herein relate to a multilayer polymer construct that can be used as a controlled guest agent release device and method of making the same. The guest agent release device can encapsulate thermally unstable bioactive drugs and/or molecules and be produced on a large scale. In one example, the guest agent release device includes a plurality multilayer, polymer composite microparticles. Each of the plurality multilayer, polymer composite microparticles include alternating first polymer layers and second polymer layers. The first polymer layers can be swollen by solvent immersion to accommodate one or more guest agents. The second polymer layers can be resistant to swelling by solvent immersion. The guest agents can be released from the microparticles and the first polymer layers in a temporally controlled, sustained, and/or delayed manner upon delivery and/or administration to a site of interest.

DETAILED DESCRIPTION

Embodiments described herein relate to a multilayer polymer construct that can be used as a controlled guest agent release device and method of making the same. The guest agent release device can encapsulate thermally unstable bioactive drugs and/or molecules and be produced on a large scale. In one example, the guest agent release device includes a plurality multilayer, polymer composite microparticles. Each of the plurality multilayer, polymer composite microparticles include alternating first polymer layers and second polymer layers. The first polymer layers can be swollen by solvent immersion to accommodate one or more guest agents. The second polymer layers can be resistant to swelling by solvent immersion. The guest agents can be released from the microparticles and the first polymer layers in a temporally controlled, sustained, and/or delayed manner upon delivery and/or administration to a site of interest.

Figure 1:
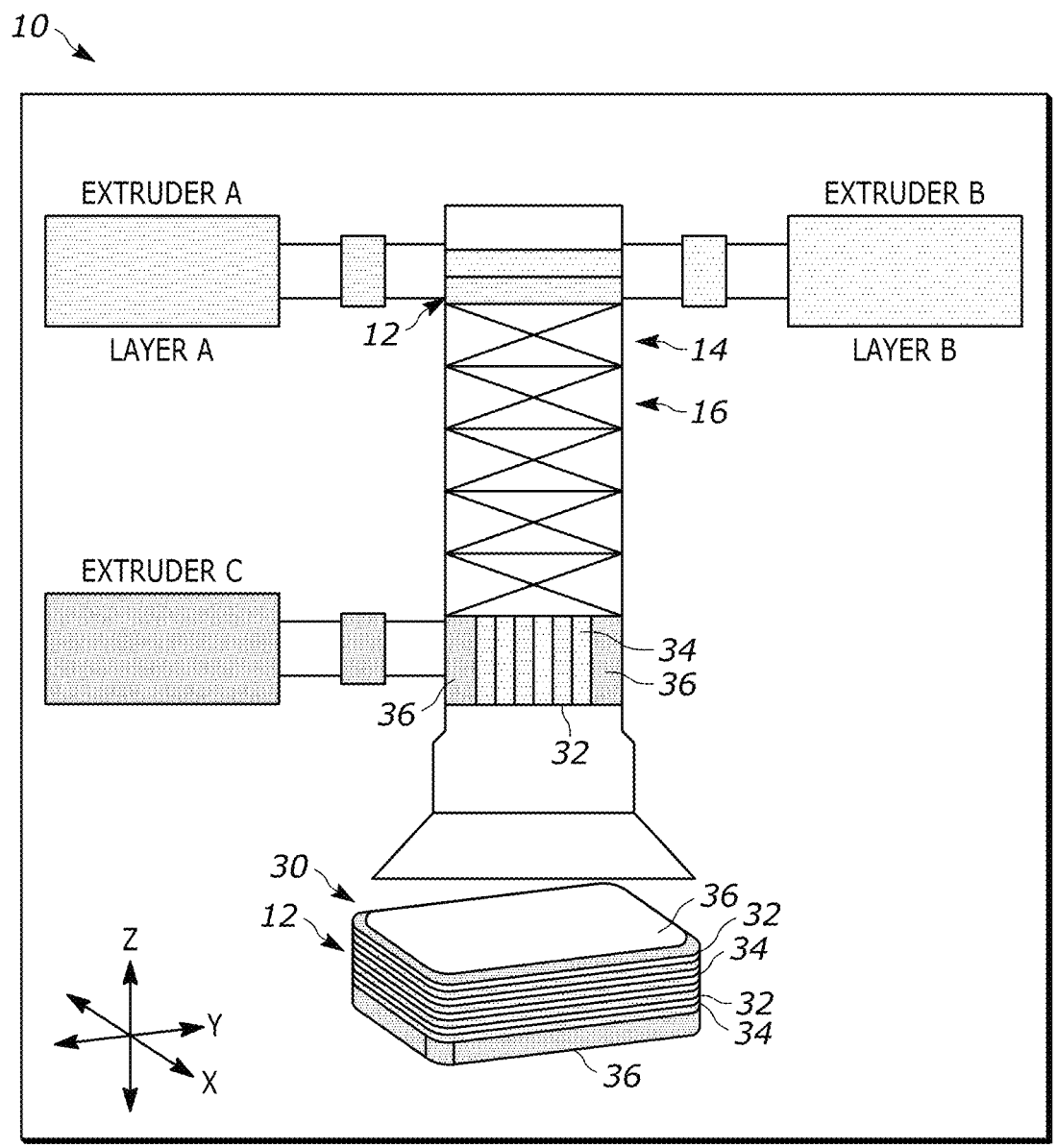
FIG. 1 is a schematic illustration of a coextrusion and layer multiplying device and process to form an example multilayer polymer composite film.

FIG. 1 illustrate an example coextrusion and multiplying or multilayering process 10 used to form a multilayer polymer composite film or sheet 30, which can be used to form the guest release device. In the process 10, a first polymer layer 32 and a second polymer layer 34 are provided. The first layer 32 is formed from a first polymer material (A). The second polymer layer 34 is formed from a second polymer material (B). The second polymer material (B) has a substantially similar viscosity to the first polymer material (A) and is substantially immiscible with the first polymer material (A) when coextruded.

The first and second polymer materials (A), (B) are coextruded to form a polymer composite having a plurality of discrete layers 32, 34 that collectively define a polymer composite stream 12. It will be appreciated that one or more additional layers formed from the polymer materials (A) or (B) or formed from different polymer materials may be provided to produce a polymer composite stream 12 that has at least three, four, five, six, or more layers of different polymer materials. Although one of each layer 32 and 34 is illustrated in the composite stream 12 of FIG. 1 it will be appreciated that the polymer composite stream 12 may include, for example, up to thousands of each layer 32, 34. In any case, the polymer composite stream 12 is then divided, stacked, and multiplied to form the multilayer polymer composite film 30 having, for example, hundreds or thousands of alternating layers 32, 34.

One or more dies, two of which are indicated at 14 and 16 in FIG. 1, can be used to multiply the coextruded layers 32, 34. Each layer 32, 34 in the completed multilayer polymer composite film 30 extends within an x-y plane of an x-y-z coordinate system. Each layer 32, 34 initially extends in the y-direction. The y-direction defines the length of the layers 32, 34 and extends in the general direction of material flow through the dies 14, 16. The x-direction extends transverse, e.g., perpendicular, to the y-direction and defines the width of the layers 32, 34. The z-direction extends transverse, e.g., perpendicular, to both the x-direction and the y-direction and defines the height or thickness of the layers 32, 34.

In some embodiments, the multilayer film 30 can include at least 4, 6, 8, 10, 12, 14, 16, 18, 20, 30, 40, 50, 60, 70, 80, 90, 100 or more layers, including any number of layers within that range. For example, the multilayer film can have from about 30 to about 10000 layers. The multilayer film can be in the form of sheet. By altering the relative flow rates or the number of layers, while keeping the film or sheet thickness constant, the individual layer thickness can be controlled. The multilayer structure film or sheet has an overall thickness ranging from 100 nanometers to 1000 micrometers mils, for example, from about 200 nanometers to about 500 micrometers and any increments therein. Further, the multilayer film 30 may be formed into a number of articles. The structures may be formed by coextrusion techniques initially into films or sheets which may then be post formed. Such post forming operations may include thermoforming, vacuum forming, or pressure forming. Further, through the use of forming dies, the multilayer structures may be formed into a variety of useful shapes including profiles, tubes and the like.

Once the multilayer film 30 is formed that includes the plurality of alternating layers 32, 34, a detachable skin or surface layer 36 can be applied to the top and bottom of the film via coextrusion prior to the film exiting the last die. The skin layers 36 can be applied such that the film 30 is sandwiched therebetween. The skin layer 36 may be formed from the first polymer material (A), the second polymer material (B) or a third polymer material (C) different from the first and second polymer materials (A), (B). One or both of the skin layers 36 can, however, be omitted (not shown).

Polymer materials used in the process described herein can include a material having a weight average molecular weight (MW) of at least 5,000. For example, the polymer material can be an organic polymeric material, which can readily be coextruded. Such polymer materials can be glassy, crystalline or elastomeric polymer materials.

Examples of polymer materials that can potentially be coextruded to form the first polymer material (A) and the second polymer material (B) include, but are not limited to, polyethers, such as polyethylene and polyethylene oxide (PEO); polyesters, such as poly(ethylene terephthalate) (PET), poly(butylene terephthalate), polycaprolactone (PCL), and poly(ethylene naphthalate)polyethylene; naphthalate and isomers thereof, such as 2,6-, 1,4-, 1,5-, 2,7-, and 2,3-polyethylene naphthalate; polyalkylene terephthalates, such as polyethylene terephthalate, polybutylene terephthalate, and poly-1,4-cyclohexanedimethylene terephthalate; polyimides, such as polyacrylic imides; polyetherimides; styrenic polymers, such as polystyrene (PS), atactic, isotactic and syndiotactic polystyrene, α-methyl-polystyrene, para-methyl-polystyrene; polycarbonates, such as bisphenol-A-polycarbonate (PC); polyethylenes oxides; poly (meth)acrylates such as poly(isobutyl methacrylate), poly (propyl methacrylate), poly(ethyl methacrylate), poly (methyl methacrylate), poly(butyl acrylate) and poly(methyl acrylate) (the term "(meth)acrylate" is used herein to denote acrylate or methacrylate); cellulose derivatives; such as ethyl cellulose, cellulose acetate, cellulose propionate, cellulose acetate butyrate, and cellulose nitrate; polyalkylene polymers such as polypropylene, polyethylene, high density polyethyelene (HDPE), low density polyethylene (LDPE), polybutylene, polyisobutylene, and poly(4-methyl)pentene; fluorinated polymers such as perfluoroalkoxy resins, polytetrafluoroethylene, fluorinated ethylene-propylene copolymers, polyvinylidene fluoride, polyvinylidene difluoride (PVDF), and polychlorotrifluoroethylene and copolymers thereof; chlorinated polymers such as polydichlorostyrene, polyvinylidene chloride and polyvinylchloride; polysulfones; polyethersulfones; polyacrylonitrile; polyamides such as nylon, nylon 6,6, polycaprolactam, and polyamide 6 (PA6); polyvinylacetate; polyether-amides.

Copolymers, such as styrene-acrylonitrile copolymer (SAN), preferably containing between 10 and 50 wt %, preferably between 20 and 40 wt %, acrylonitrile, styrene-ethylene copolymer; and poly(ethylene-1,4-cyclohexylenedimethylene terephthalate) (PETG), can also be used as either the host polymer material 40 in the first polymer material (A) or the second polymer material (B). Additional polymer materials include an acrylic rubber; isoprene (IR); isobutylene-isoprene (IIR); butadiene rubber (BR); butadiene-styrene-vinyl pyridine (PSBR); butyl rubber; chloroprene (CR); epichlorohydrin rubber; ethylene-propylene (EPM); ethylene-propylene-diene (EPDM); nitrile-butadiene (NBR); polyisoprene; silicon rubber; styrene-butadiene (SBR); and urethane rubber. Polymer materials can also include block or graft copolymers. In one instance, the polymer materials used to form the layers 32, 34 may constitute substantially immiscible thermoplastics that when coextruded have a substantially similar viscosity.

In addition, each individual layer 32, 34 may include blends of two or more of the above-described polymers or copolymers. The components of the blend can be substantially miscible with one another yet still maintain substantial immiscibility between the layers 32, 34.

In some embodiments, the first and second polymer materials (A), (B) comprising the layers 32, 34 can include organic or inorganic materials, including nanoparticulate materials, designed, for example, to modify the mechanical properties of the polymer materials, e.g., tensile strength, toughness, and yield strength. It will be appreciated that potentially any extrudable polymer material can be used as either the host polymer 40 in the first polymer material (A) or the second polymer material (B) so long as upon coextrusion such polymer materials (A), (B) are substantially immiscible, have a substantially similar viscosity, and form discrete layers or polymer regions. In one example, the first polymer material (A) is PEO, the second polymer material (B) is PCL, and the third polymer material (C) is PE.

Figure 2:
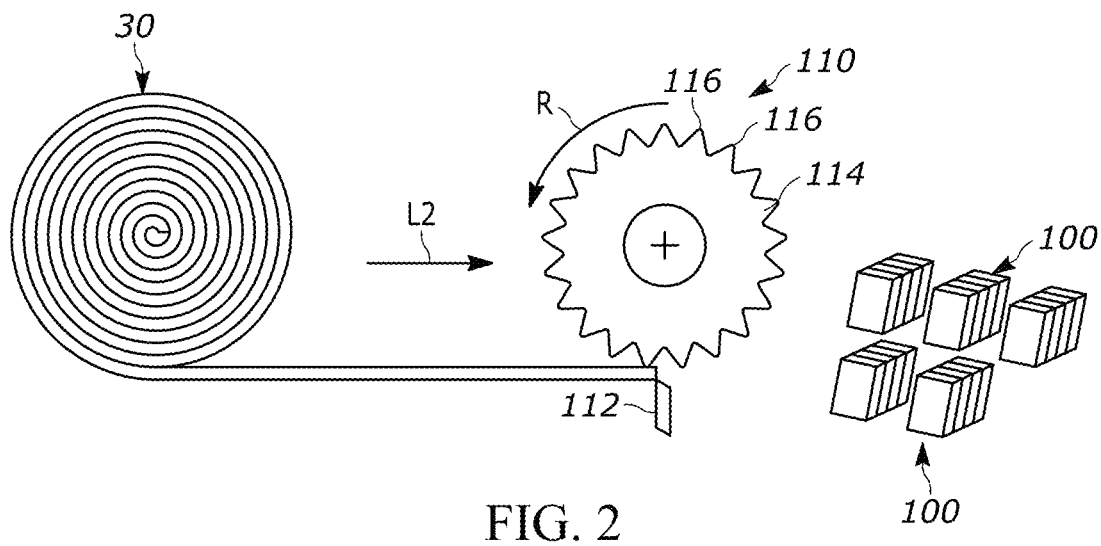
FIG. 2 illustrates a process for forming multilayer particles from the loaded multilayer film of FIG. 1.
Figure 3:
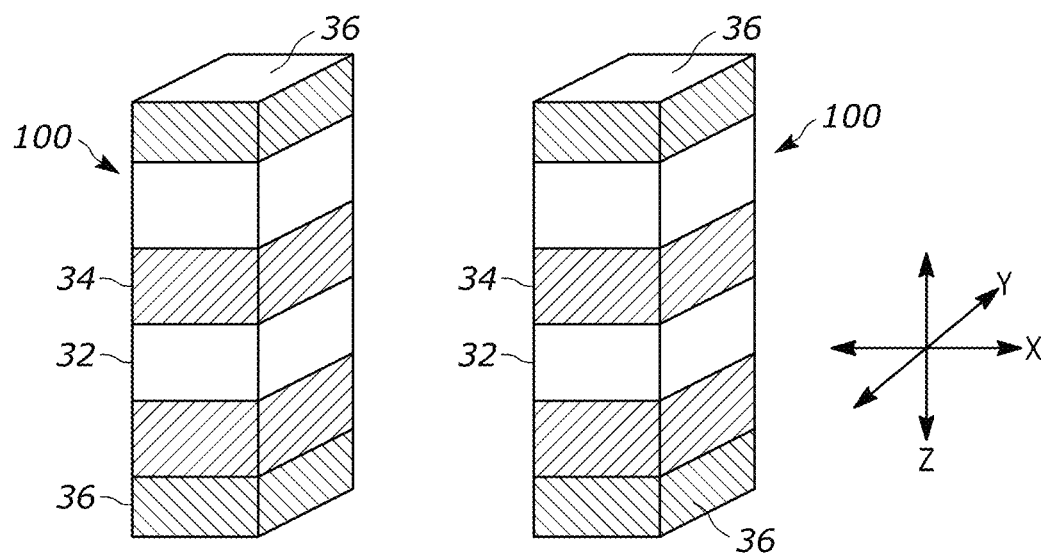
FIG. 3 illustrates multilayer particles formed by the process of claim 2.

The multilayer film so formed can then mechanically divided to form a plurality of multilayer polymer composite particles. As shown in FIGS. 2-3, the multilayer film 30 can be divided, for example, by mechanically chopping and/or cutting the multilayer film 30 into a different multilayer polymer construct, namely, multilayer polymer composite particles 100. To this end, the multilayer film 30 can be provided in a rolled form and fed in the manner L to a machine 110 that includes a stationary blade 112 and blade 114 that rotates in the manner R. The blades 112, 114 cooperate to cut or chop the multilayer film 30 into the particles 100 having a round or polygonal shape, depending on the shapes of the blades 112, 114. The circumferential spacing between the cutting tines 116 on the blade 114 help to determine the dimensions of the particles 100.

In other embodiments, the multilayer microparticles can be formed by dividing the multilayered polymer composite film 30 by etching the multilayered polymer composite film 30 using, for example, an etching gas removes portions of the multilayer polymer composite film that are exposed from an overlying mask.

The size of the particles 100 depends on the thickness in the z-direction of the multilayer film 30 when the coextrusion process 10 is complete. It will be appreciated that particles 100 can be formed having dimensions on the micro- or nano-level. For example, the particles 100 can have dimensions on the order of about 100 μm, on the order of about 50 μm, on the order of about 10 μm, on the order of 1 μm, on the order of about 500 nm. That said, the particles 100 can be formed as square microparticles and can have an about 50 nm×about 50 nm to an about 500 μm×about 500 μm x-y footprint, for example, an about 50 nm×about 50 nm, an about 100 nm×about 100 nm, an about 1 μm×1 μm, an about 100 μm×about 100 μm, or an about 500×500 μm x-y footprint. In some embodiments, the microparticles having a size of about 50 nm to about 500 μm wide×about 50 nm to about 500 μm long×about 100 nm to about 150 μm thick In another example, the multilayer film 30 can be formed into elongated, square or rectangular fibers in a manner similar to the production of the particles 100, i.e., by cutting or chopping the multilayer film. In yet another example, the multilayer film 30 is maintained as the sheet produced by the process 10.

In some embodiments, the first polymer layers 32 include a biodegradable and/or biocompatible first polymer (A) that swells when immersed in a solvent, and the second polymer layers 34 include a biodegradable and/or biocompatible second polymer material (B) that differs from the first polymer material (A) and is resistant to swelling in the solvent. Swelling of the first polymer material (A) and first polymer layers 32 but not the second polymer material (B) and second polymer layers (34) during solvent immersion allows guest agents 50, which are provided or dissolved in the solvent, to diffuse and/or be loaded into the first polymer layers 32 and not the second polymer layers 34.

In some embodiments, the first polymer material (A) and/or first polymer layers 32 can swell by volume at least about 5%, at least about 10%, at least about 15%, at least about 20%, at least about 25%, at least about 30%, at least about 40%, at least about 50%, at least about 60%, at least about 70%, at least about 80%, at least about 90%, at least about 100%, at least about 200%, or more when immersed in the solvent relative to the swelling of the second polymer material and/or second polymer layers 34.

Following diffusion and/or loading of the first polymer layers 32 with the guest agent during solvent immersion, the microparticles 100 can be dried such that the solvent is removed from the first polymer layers and the guest agent 50 is encapsulated and/or loaded in the first polymer layers 32. The dried marticles can have substantially the same dimension prior to solvent immersion.

The guest agent 50 can be hydrophobic or hydrophilic. In some embodiments, the guest agent can be thermally unstable and/or degrade at the extrusion temperature of the first polymer material or second polymer material and/or degrade if extruded with the first polymer material and/or the second polymer material.

In some embodiments, the guest agent 50 can be a diagnostic agent, such as a fluorescent or non-fluorescent dye (such as methyl orange, Rhodamine B, Oil Red, Nile Red, Thio-michler's ketone, ethidium bromide or methylene blue) or a bioactive agent including thermally stable or unstable therapeutic agents, drugs, and/or molecules (such as Curcumin, Aspirin, Ibuprofen, acetaminophen, Doxorubicin, Vitamin B2 (Riboflavin), Vitamin C, Vitamin B9 (folic acid) and other vitamins and anti-cancer drugs).

The guest agent 50 can have any therapeutic, diagnostic, or other value when administered to an animal, particularly to a mammal, such as drugs, nutrients, cosmetics (cosmeceuticals), and diagnostic agents. Specific non-limiting examples of therapeutic agents that can be used as the guest agent 50 include analgesics and anti-inflammatory agents, anthelmintics, anti-arrhythmic agents, anti-asthma agents, anti-bacterial agents, anti-viral agents, anti-coagulants, anti-depressants, anti-diabetics, anti-epileptics, anti-fungal agents, anti-gout agents, anti-hypertensive agents, anti-malarials, anti-migraine agents, anti-muscarinic agents, anti-neoplastic agents and immunosuppressants, anti-protozoal agents, anti-thyroid agents, anti-tussives, anxiolytic, sedatives, hypnotics and neuroleptics, (3-blockers, cardiac inotropic agents, diuretics, anti-parkinsonian agents, gastrointestinal agents, histamine H,-receptor antagonists, keratolytics, lipid regulating agents, muscle relaxants, anti-anginal agents, nutritional agents, analgesics, sex hormones, stimulants, cytokines, peptidomimetics, peptides, proteins, toxoids, antibodies, nucleosides, nucleotides, genetic material, and nucleic acids. suitable agents include water soluble complex polysaccharides having at least two and preferably three or more monosaccharide units and additionally containing one or more of the following chemical substituents: amino groups (free or acylated), carboxyl groups (free or acylated), phosphate groups (free or esterified) or sulfate groups (free or esterified). Preferred water soluble active agents include RGD fibrinogen receptor antagonists, enkephalins, growth hormone releasing peptides and analogues, vasopressins, desmopressin, luteinizing hormone releasing hormones, melanocyte stimulating hormones and analogues, calcitonins, parathyroid hormone, PTH-related peptides, insulins, atrial natriuretic peptides and analogues, growth hormones, interferons, lymphokines, erythropoietins, interleukins, colony stimulating factors, tissue plasminogen activators, tumor necrosis factors, complex polysaccharides, and nucleosides, nucleotides and their polymers. More than one guest agent 50 can be encapsulated within the first layers 32.

Figure 4:
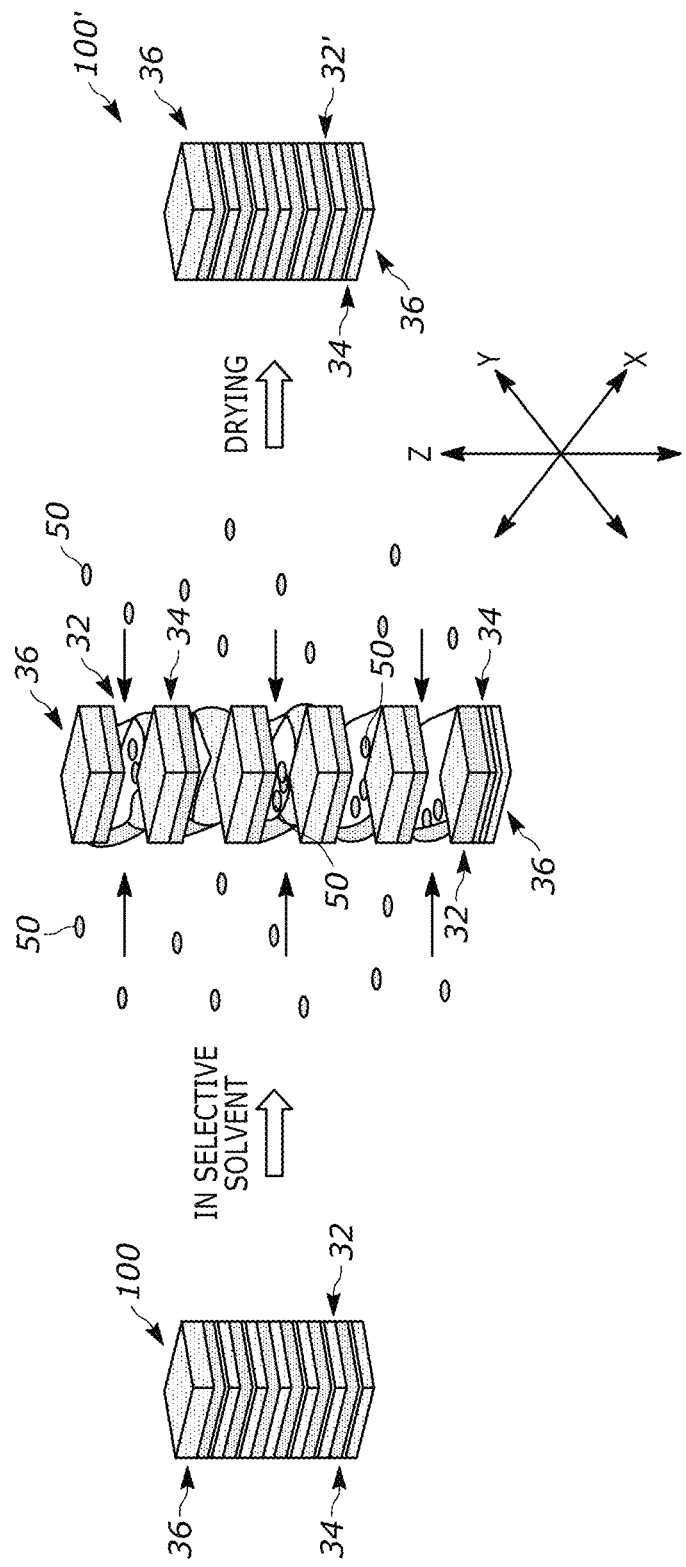
FIG. 4 is a schematic illustration of a swelling and loading process used with the microparticles of FIG. 3.
Figure 5:
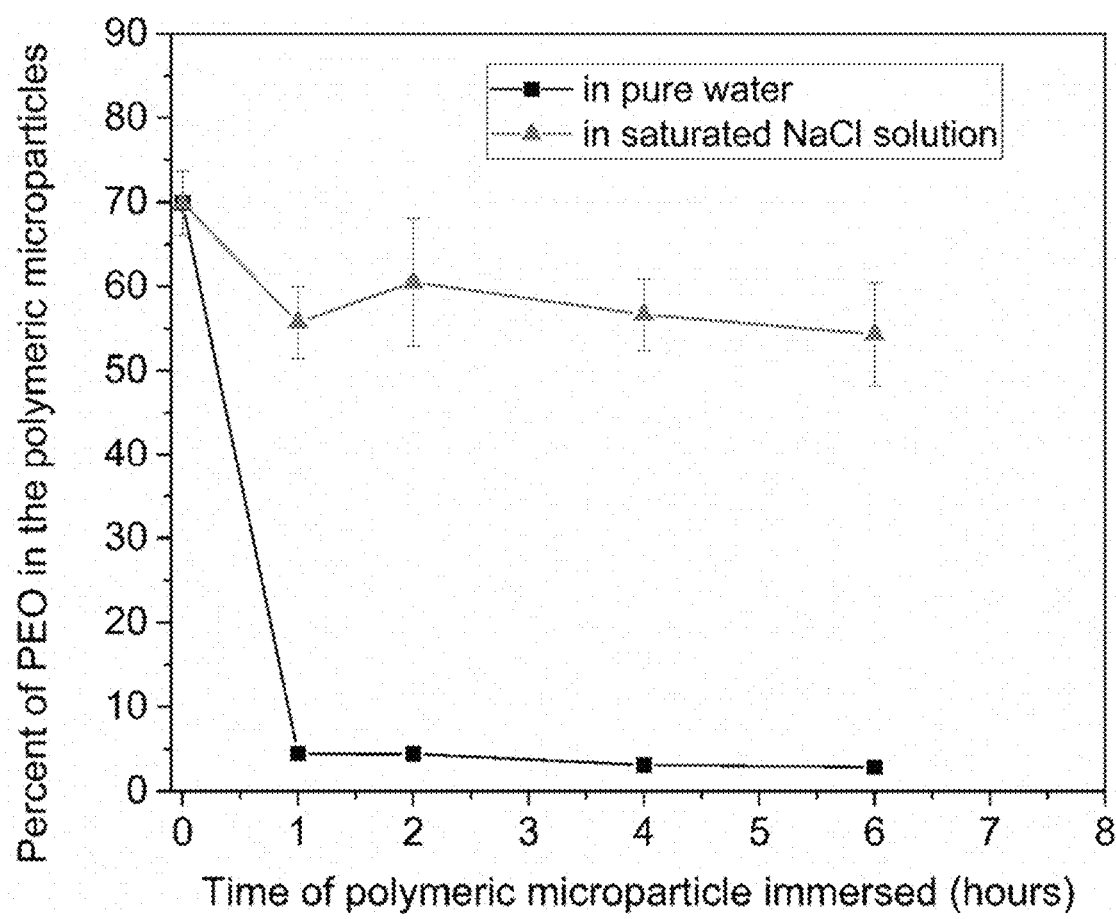
FIG. 5 is a graph illustrating how PEO dissolves when immersed in different solvents.

Referring to FIG. 4, the particles 100 are immersed in solvent such that the first layers 32 become swollen, thereby increasing in size in at least one of the x-, y-, and z-directions. In one example, a NaCl aqueous solution can be used to swell the first layers 32 when the first polymer material (A) is PEO. FIG. 5 illustrates how PEO dissolves when immersed in different solvents, namely, pure water and saturated NaCl. It is clear from FIG. 5 that the dissolving rate of PEO can be adjusted by varying the concentration of NaCl.

Swelling the first layers 32 increases the ability of the first layers to absorb and retain one or more of the guest agents 50. The microparticles 100 can be immersed in a mixture including the solvent and guest agent(s) 50 in order to load the guest agent(s) into the first layers 32. When this occurs, the guest agents 50 become encapsulated within the swelled first layers 32. The particles following swelling and loading of the guest agent 50 are given the reference number 100' for clarity. Once the guest agent 50 is loaded into the particles 100', the particles are dried such that the swollen first layers 32 shrink back down to a size and thickness approximating the pre-swelling size of the first layers.

The guest agents can be released from the microparticles 100 and the first polymer layers 32 in a temporally controlled, sustained, and/or delayed manner upon delivery and/or administration to a site of interest by either swelling and/or degradation of the first polymer material (A) and/or second polymer material (B) at the site of administration the microparticles. In one example, the particles can include a thermally unstable therapeutic agent that is loaded into first polymer layers by solvent immersion and the particles can be delivered in vivo to a subject to provide sustained release of the guest agent by swelling or degradation (e.g., hydrolysis) of the polymers of the particles.

The encapsulation system described herein can be used in a variety of applications because swelling the first layers in a controlled manner enables a wide range of guest agents to be loaded/encapsulated within the swelled layers. The degradation of the particles can also be controlled depending on the environment to which the particles are administered.

The encapsulation system can, for example, be used in the food industry (e.g., encapsulation of flavor and other food additives); the oil and gas industry (e.g., encapsulation of corrosion inhibitors); agriculture (e.g., encapsulation of fertilizers and pesticides); personal care applications (e.g., encapsulation of vitamin C, insect repellant and lotions); catalysis (e.g., encapsulation of a catalyst); reaction vessels; and pharmaceutical applications (e.g., encapsulation of bioactive molecules such as cancer drugs or other controlled release or drug delivery technology).

The microparticles described herein can be produced in large scale by a glitter machine (represented schematically in FIG. 2). With a selective solvent system, swelling of the microparticles can be monitored by confocal microscopy and adjusted. Successful loading can monitored/confirmed by UV-vis spectroscopy, microscopy, and confocal microscopy. With the advantage of being both mass produced and capable of loading thermally loading unstable molecules (e.g., bioactive drugs and molecules) the multilayer polymer composite constructs described herein can be used for a wide range of purposes.

EXAMPLE 1

In this study, we investigated the controlled release property of polymer microparticles generated from co-extruded multilayer polymer films having alternating layers ABAB. Layer A was formed by polyethylene oxide (PEO). Layer B was formed by polycaprolactone (PCL). A skin layer C of PE was applied to the top and bottom of the multilayer film. The layers A and B contributed equally by weight to the multilayer film and totaled 128 layers. The multilayer film has a thickness of 50 µm without the PE skin layer. An orange dye (methyl orange) was added to the PCL layer.

The multilayer polymer film was mechanically chopped into microparticles each including the alternating ABAB layers. The microparticles were hexagonal with a width/length of 500+/−30 µm and a thickness of about 150+/−20 µm.

Rhodamine B Loading 20 mg of microparticles were immersed in a solution containing 10 mg of Rhodamine B combined with 1 mL ethanol and 9 mL aqueous solution of NaCl (36% in weight). The PEO layers swelled and encapsulated the Rhodamine B. Once the loading phase was complete, the microparticles were filtered by wire mesh and washed in three solvents, namely, i) 5% ethanol+95% NaCl aqueous solution (36% in weight), ii) 20% ethanol+80% NaCl aqueous solution (36% in weight), and iii) NaCl aqueous solution (18% in weight). The microparticles were then dried.

Figure 6A:
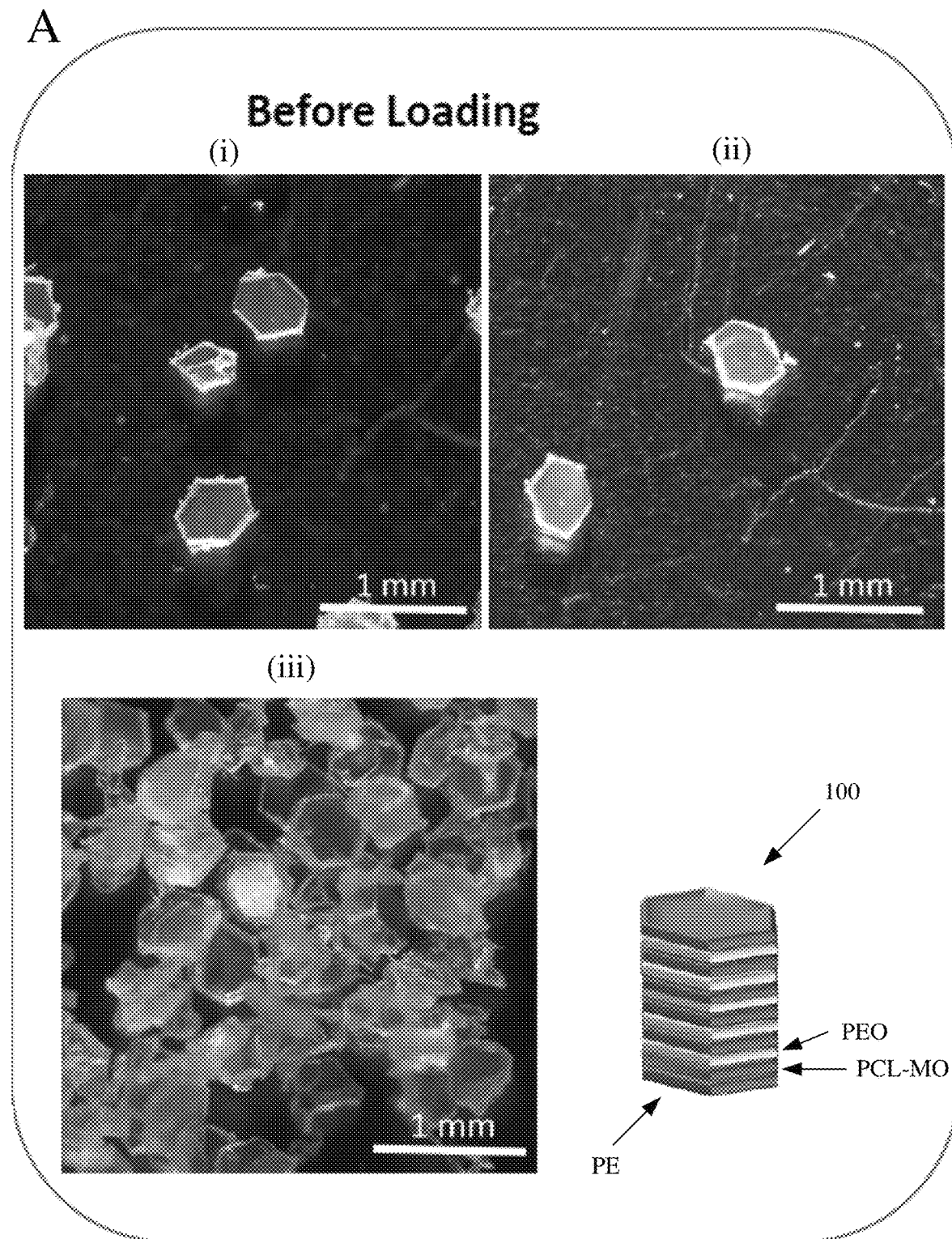
FIGS. 6(A-B) illustrates comparative microscopic images and a schematic of first example in which PEO/PCL-MO microparticles are loaded with Rhodamine B.
Figure 6B:
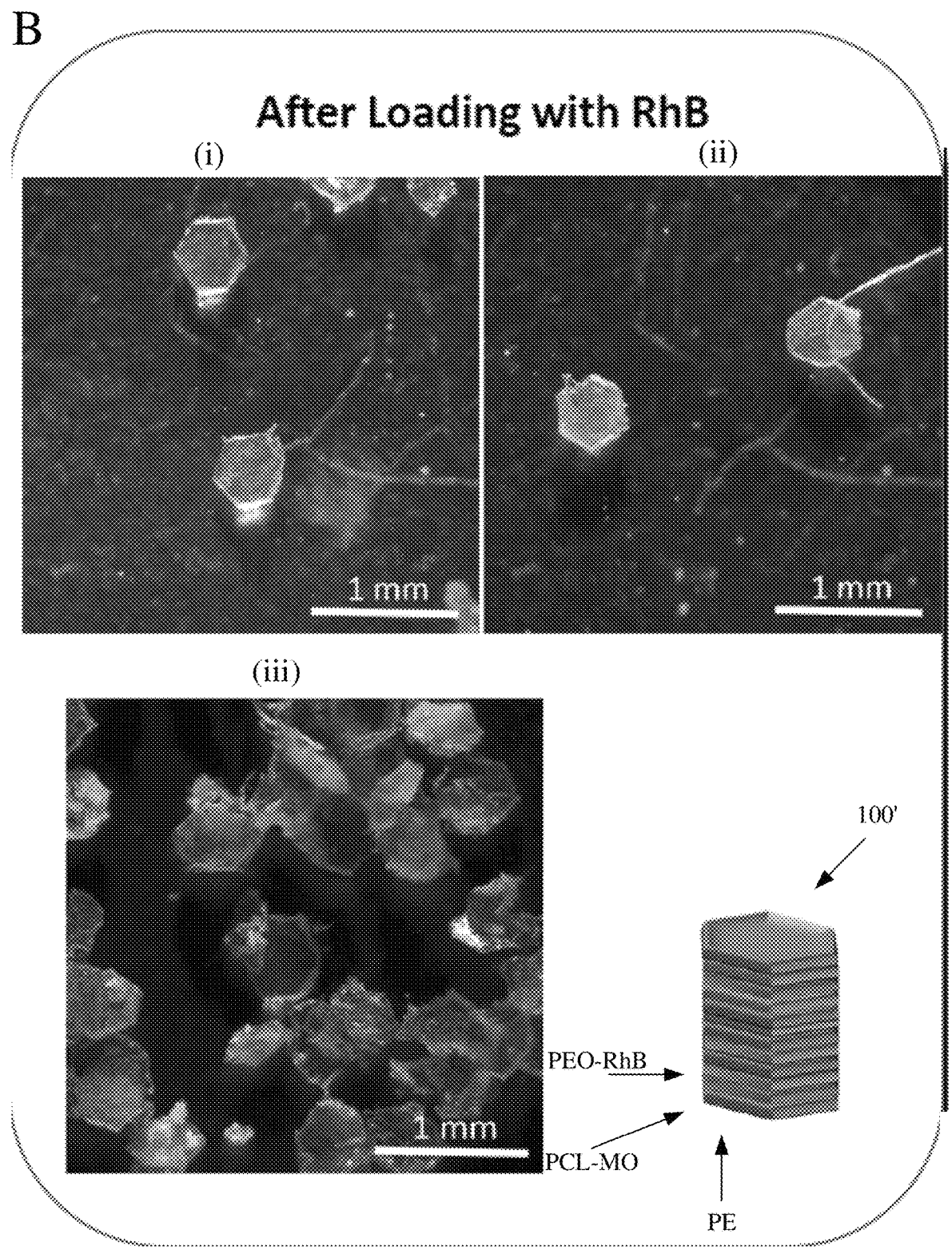

FIG. 6 illustrates comparative microscopic images of the microparticles A) before loading and B) after loading Rhodamine B. Microparticles washed in the solvent (i) before and after loading as shown in FIGS. 5A(i) and 5B(i). Microparticles washed in the solvent (ii) before and after loading as shown in FIGS. 5A(ii) and 5B(ii). Microparticles washed in the solvent (iii) before and after loading as shown in FIGS. 5A(iii) and 5B(iii).

Figure 7A:
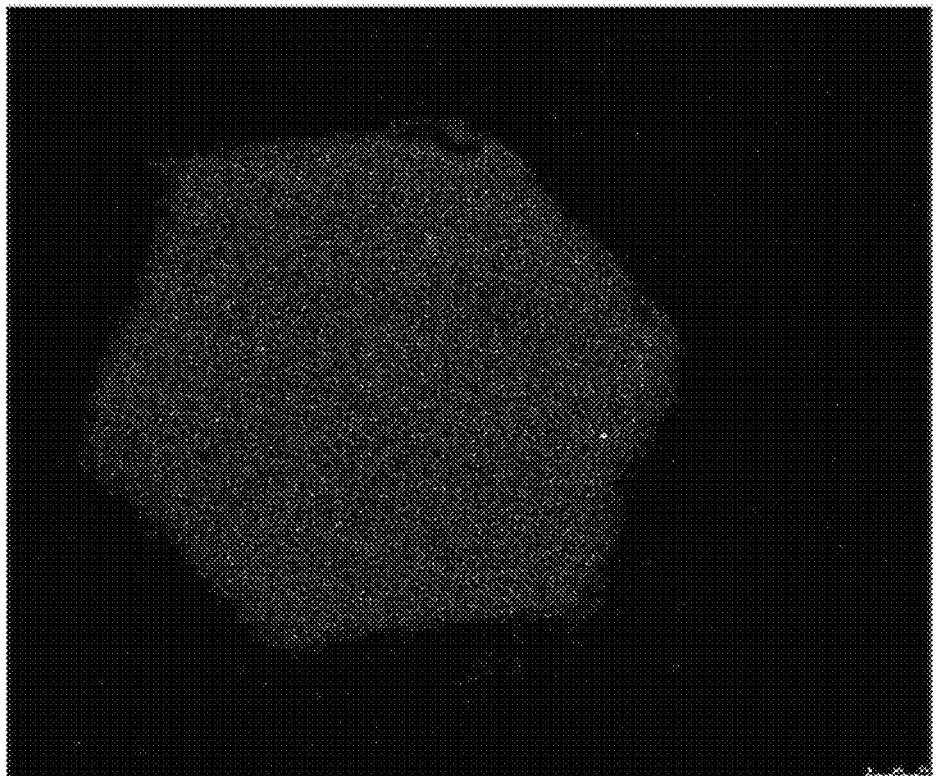
FIGS. 7(A-B) illustrate confocal microscopy images in which PEO/PCL-MO microparticles are loaded with Rhodamine B.
Figure 7B:
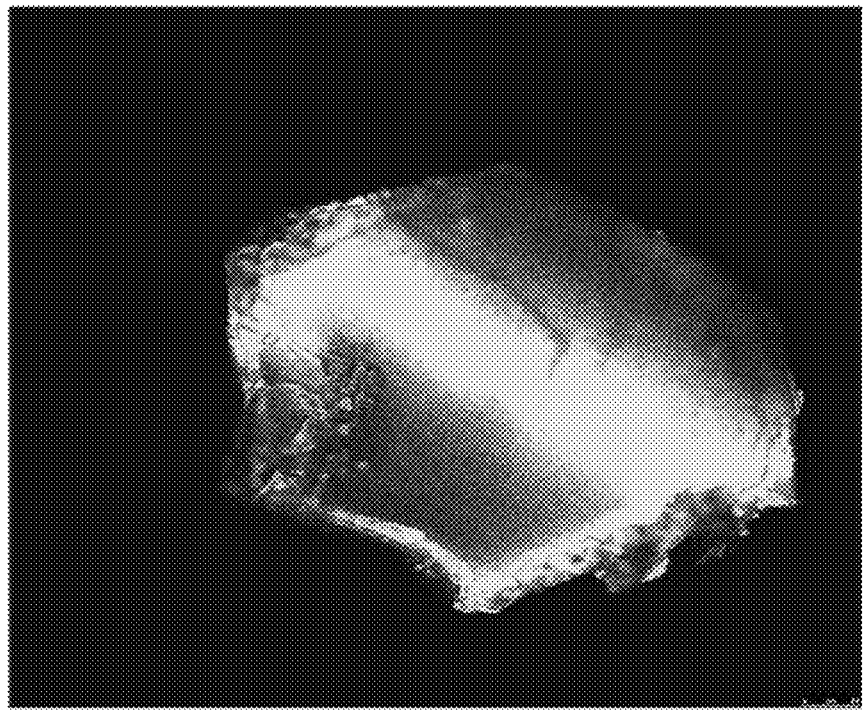
Figure 8:
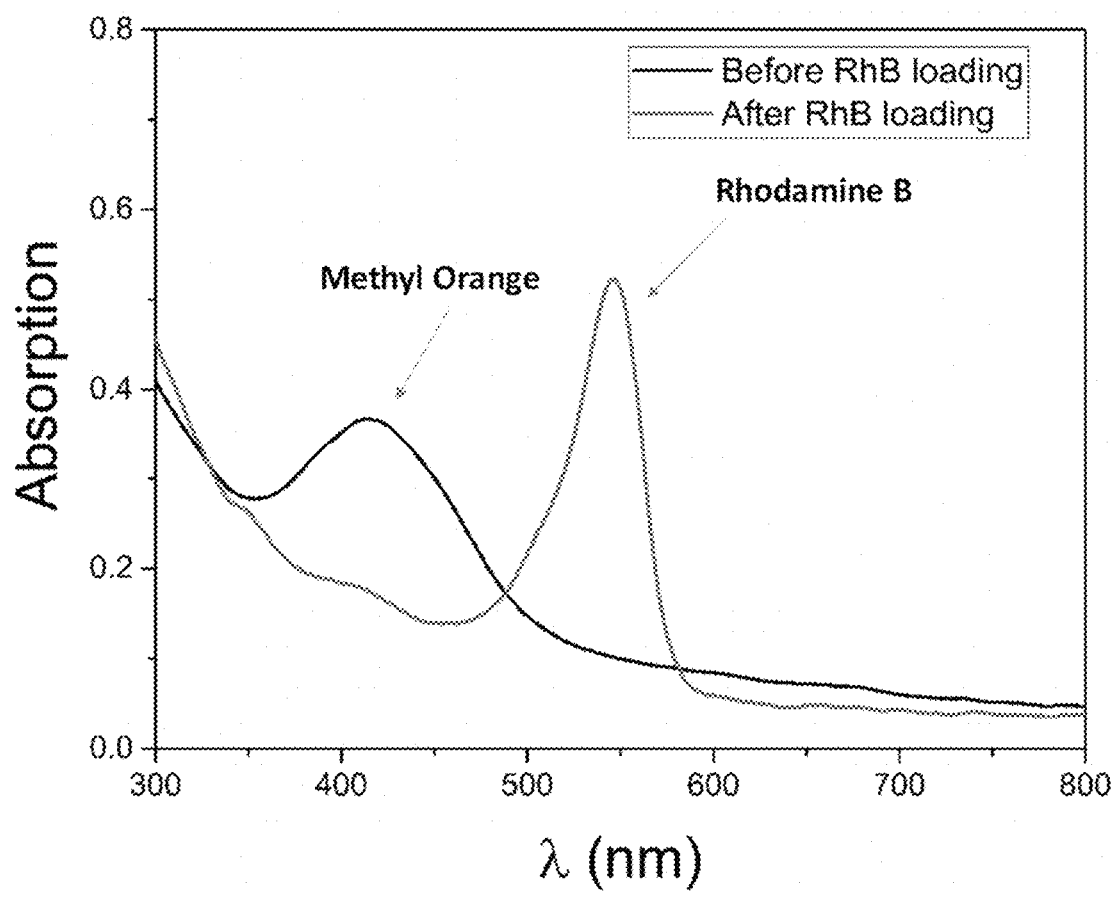
FIG. 8 illustrates comparative UV-Vis spectrum of methyl orange and Rhodamine B before and after loading of Rhodamine B.
Figure 9B:
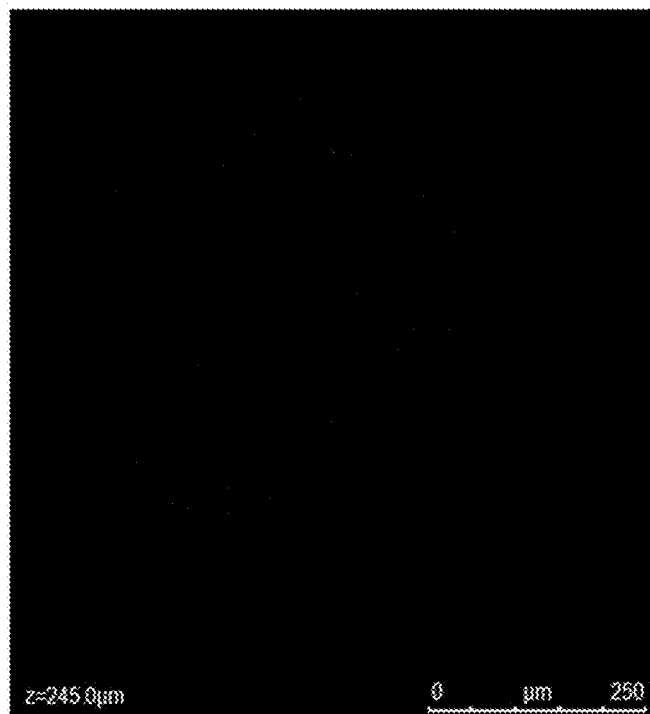
FIGS. 9(A-C) illustrate in-situ monitoring of the swell process by confocal microscopy and a graph illustrating fluorescence intensity FIGS. 10(A-B) illustrate a second example in which PEO/PCL-MO microparticles are loaded with Oil Red and Nile Red.
Figure 9B:
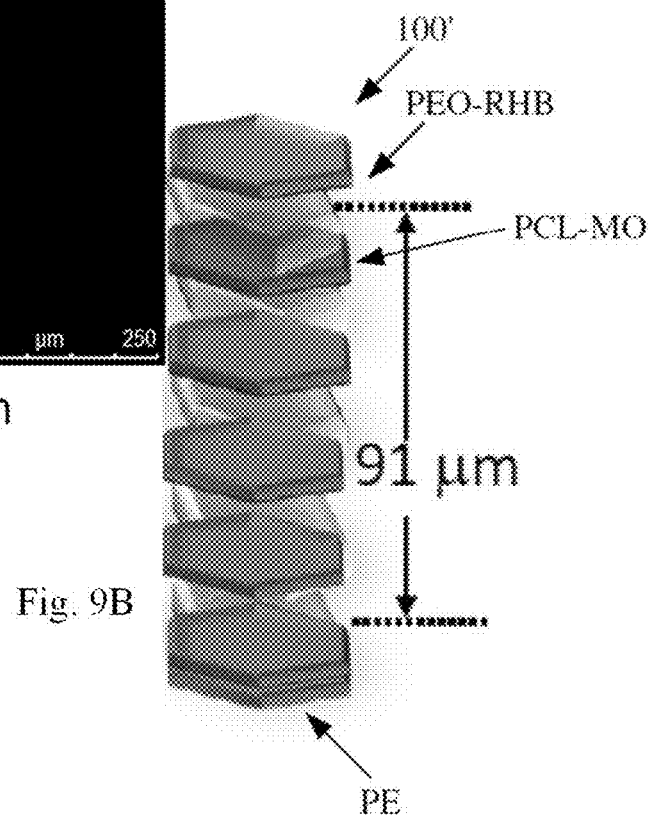
Figure 9C:
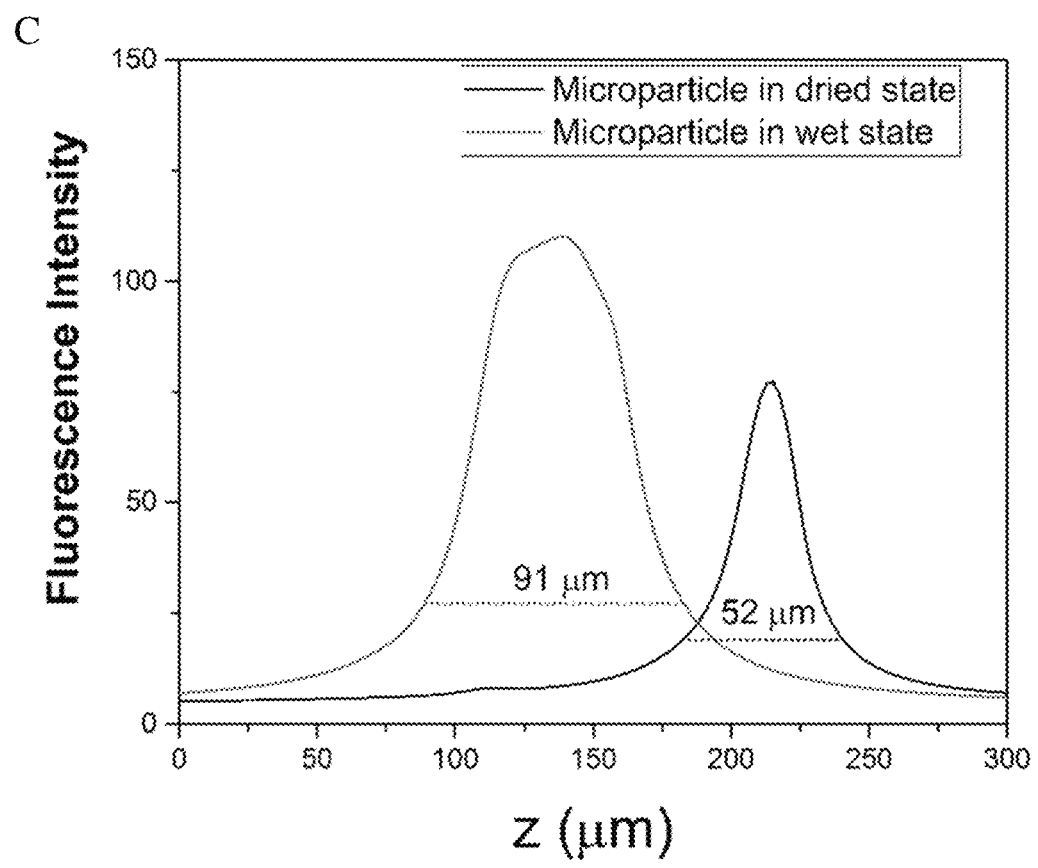

FIG. 7 shows confocal microscopy images of the microparticles A) before loading, and B) after loading. An excitation wavelength of 532 nm was used. FIG. 8 illustrates a comparative UV-Vis spectrum of methyl orange and Rhodamine B before and after the microparticles were loaded with Rhodamine B. FIG. 9 illustrates in-situ monitoring of the swelling process in the microparticle by confocal microscopy in A) a dry state when the microparticle has a thickness of 52 µm, and B) a wet state when the microparticle has a thickness of 91 µm. FIG. 9C is a graph illustrating the fluorescence intensity of the microparticles in both the dried and wet states.

Oil Red and Nile Red loading

The PEO/PCL-MO microparticles were also loaded with Oil Red and Nile Red. Once the loading phase was complete, the microparticles were filtered by wire mesh and washed in three solvents, namely, i) 5% ethanol+95% NaCl aqueous solution (36% in weight), ii) 20% ethanol+80% NaCl aqueous solution (36% in weight), and iii) NaCl aqueous solution (18% in weight). The microparticles were then dried.

Figure 10A:
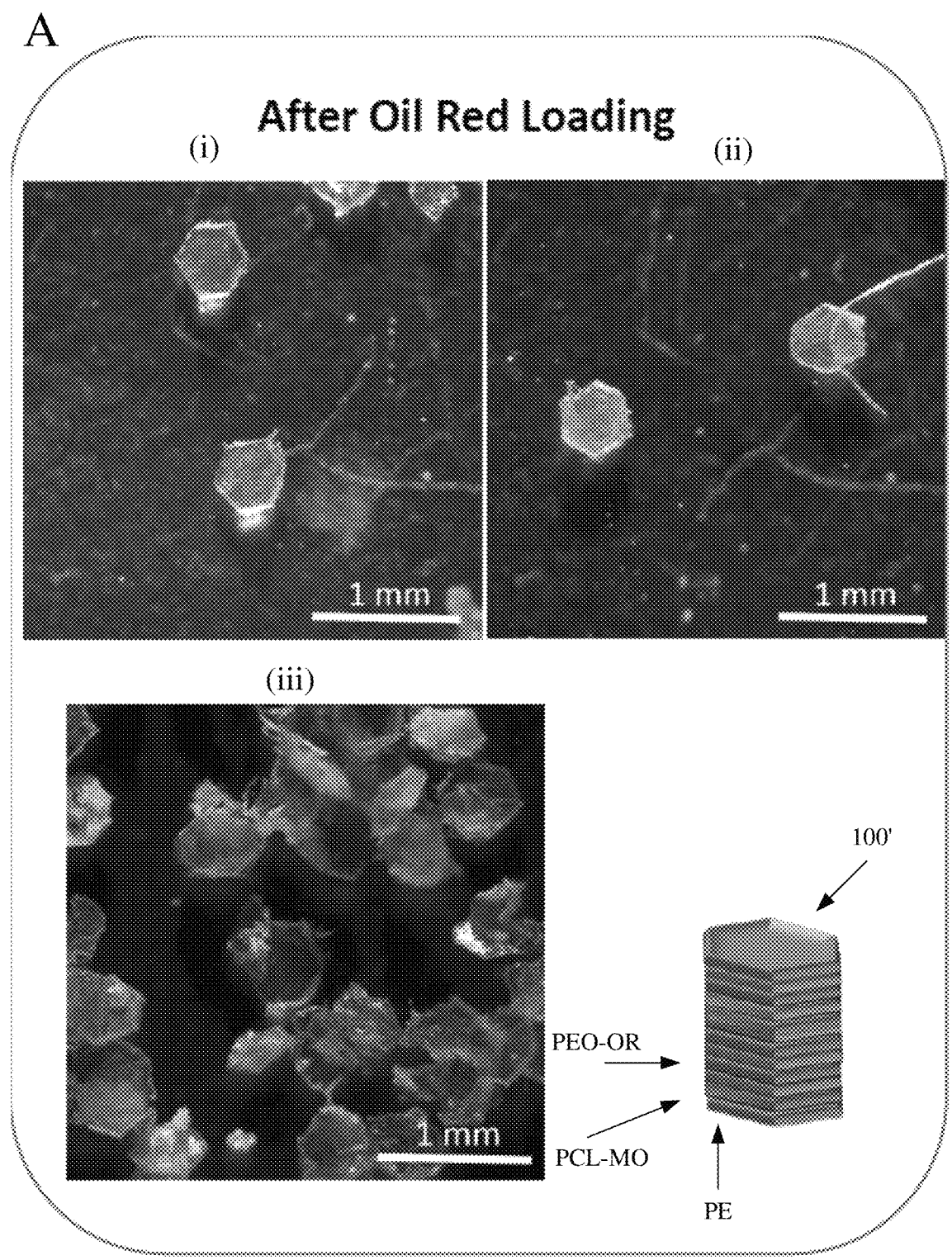
Figure 10B:
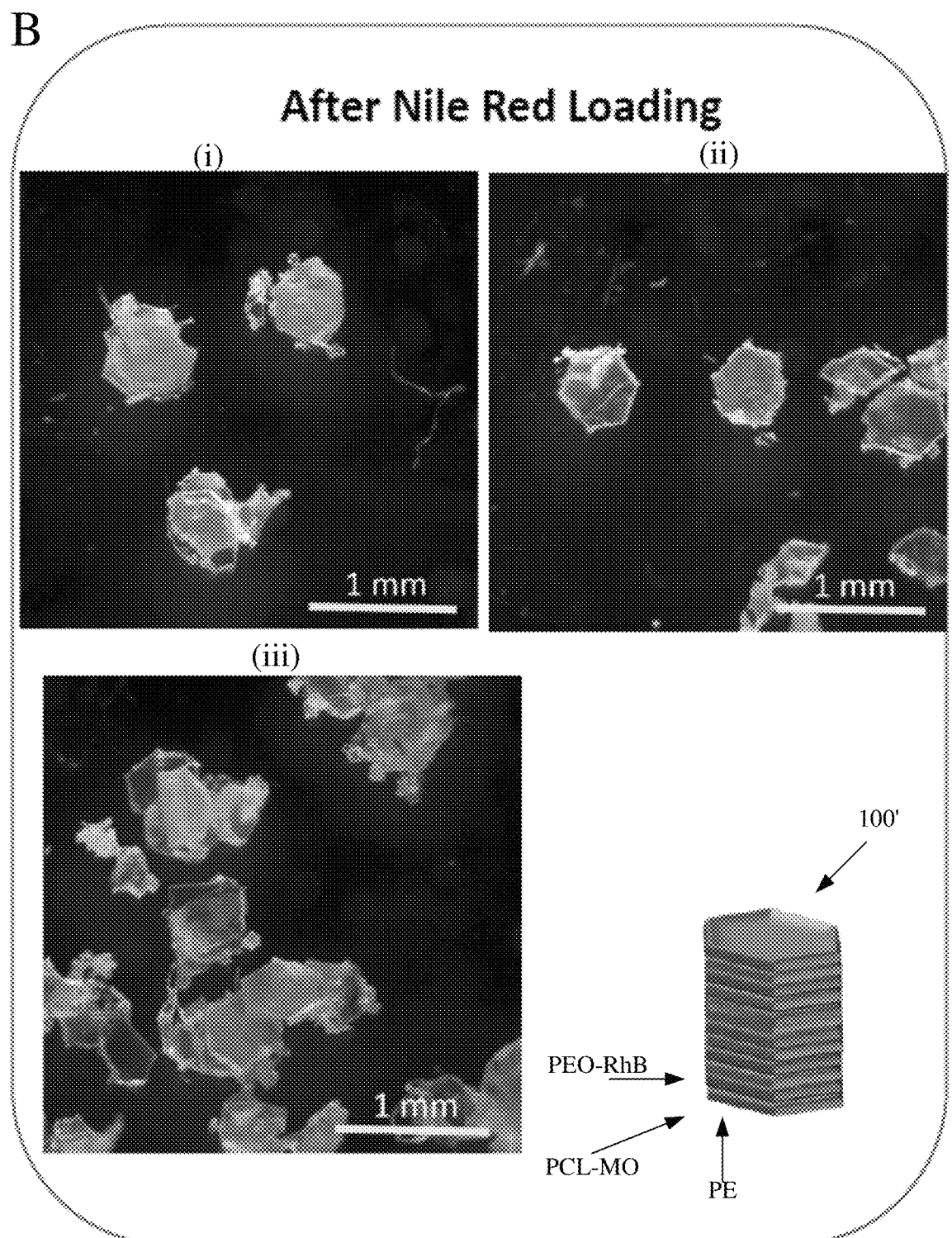

FIG. 10 illustrates comparative microscopic images of the microparticles A) after loading Oil Red, and B) after loading Nile Red. Microparticles washed in the solvent (i) and loaded with Oil Red and Nile Red are shown in FIGS. 10A(i) and 5B(i), respectively. Microparticles washed in the solvent (ii) and loaded with Oil Red and Nile Red are shown in FIGS. 10A(ii) and 10B(ii). Microparticles washed in the solvent (iii) and loaded with Oil Red and Nile Red are shown in FIGS. 10A(iii) and 10B(iii).

Figure 11A:
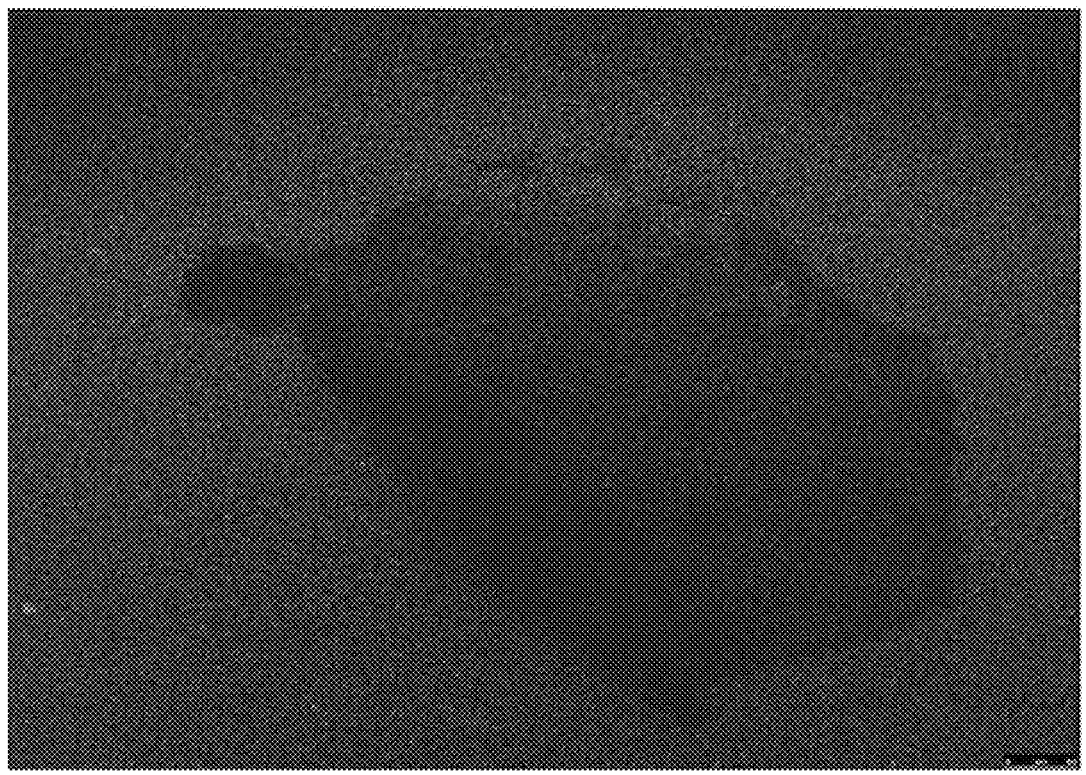
FIGS. 11(A-B) illustrate comparative microscopic images of PEO/PCL-MO microparticles loaded with Oil Red and Nile Red.
Figure 11B:
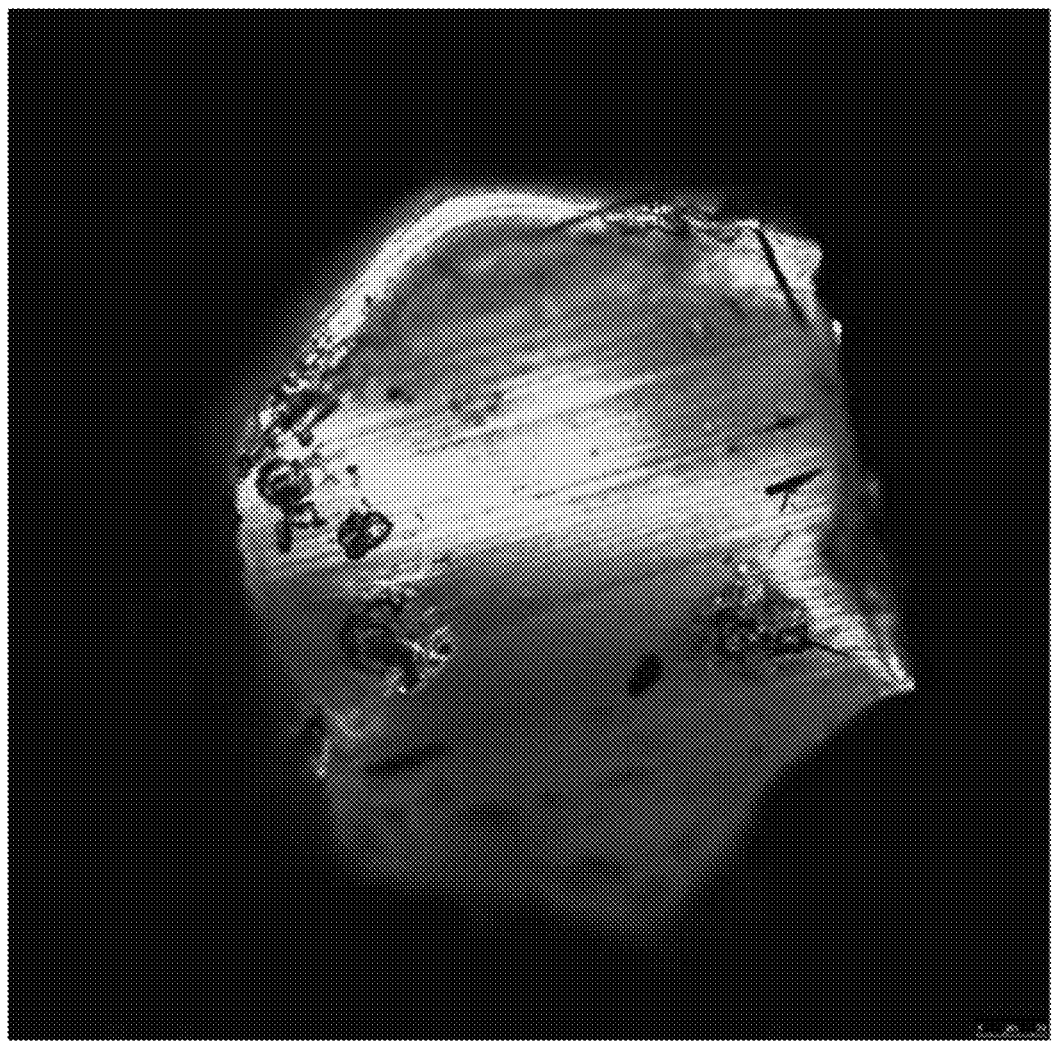
Figure 12A:
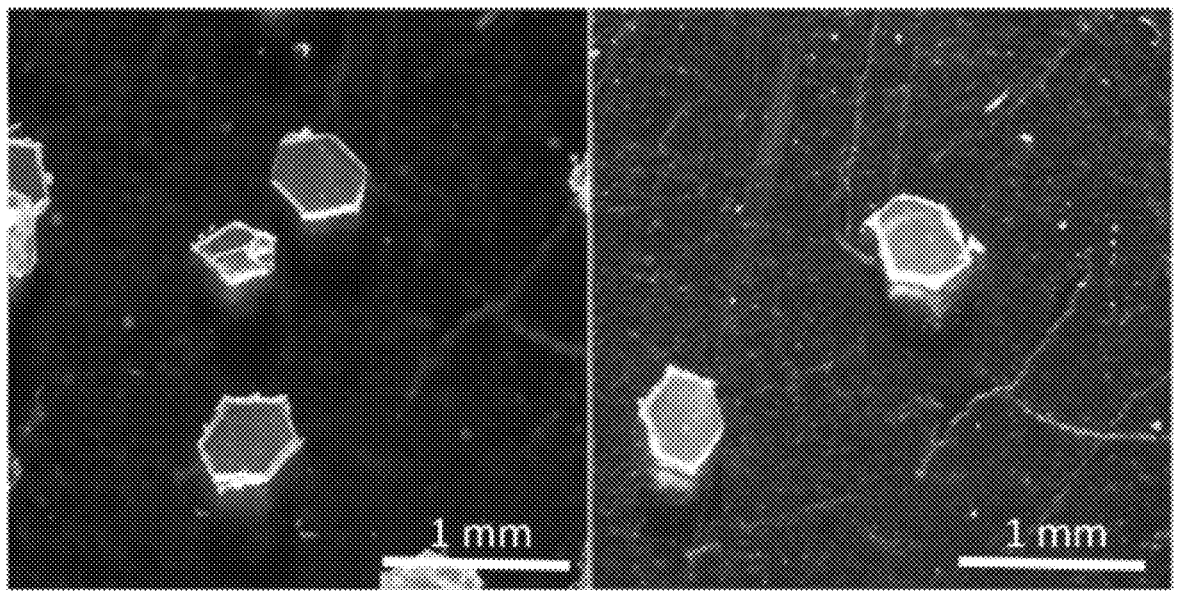
FIGS. 12(A-C) illustrate comparative microscopic images and graph of PEO/PCL-MO microparticles loaded with curcumin.
Figure 12A:
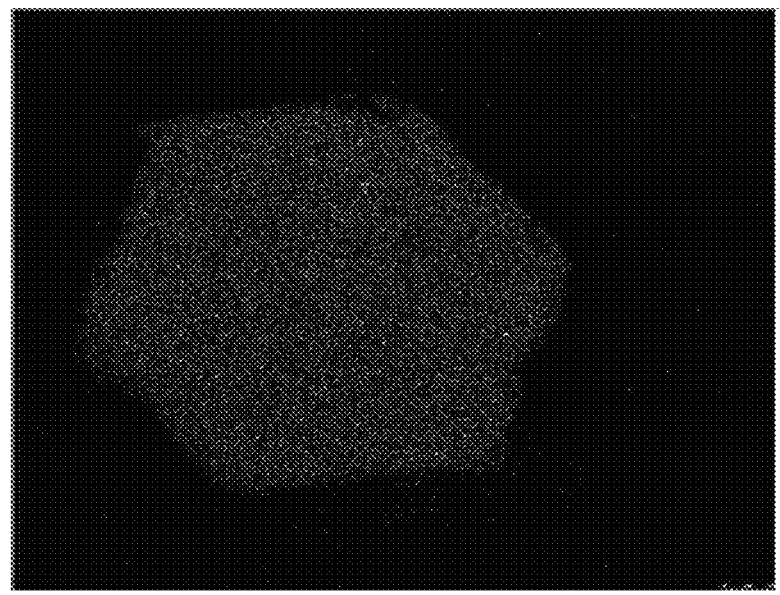
Figure 12B:
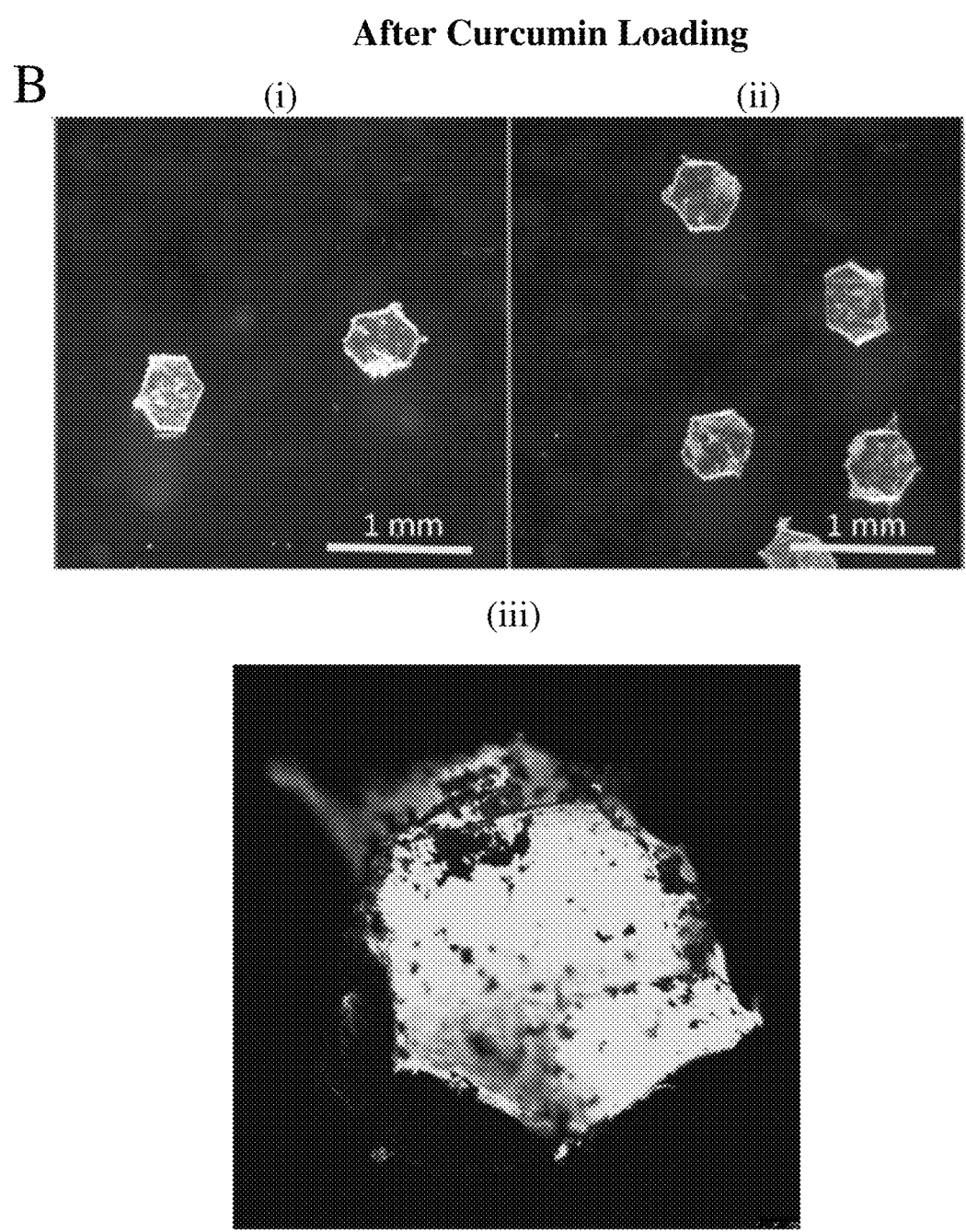
Figure 12C:
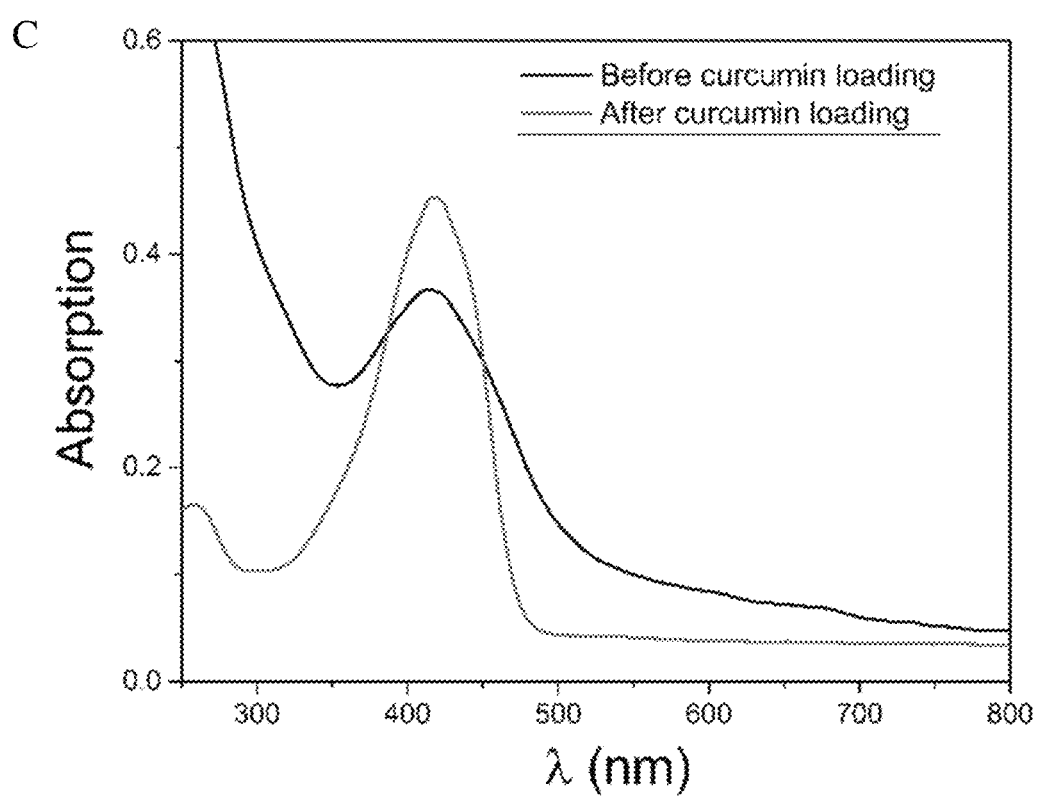

FIG. 11 illustrates confocal microscopy images of the microparticles A) after Oil Red loading, and B) after Nile Red loading.

EXAMPLE 2

In this study, the same PEO/PCL-MO microparticles were formed as in Example 1. 20 mg of microparticles were immersed in a solution containing 10 mg of curcumin combined with 1 mL ethanol and 9 mL aqueous solution of NaCl (36% in weight). The PEO layers swelled and encapsulated the curcumin Curcumin is a bioactive molecule the can be used as a spice (to provide a distinctive yellow color and flavor), as food coloring (to provide a coloring agent in cheese, butter, and other food) or in medicine (as a treatment for various respiratory conditions such as asthma and allergies or an anticancer drug that inhibits the proliferation of a wide array of cancer cells, e.g., bladder, breast, lung, pancreas, kidney, and brain).

Once the loading phase was complete, the microparticles were filtered by wire mesh and washed in three solvents, namely, i) 5% ethanol+95% NaCl aqueous solution (36% in weight), ii) 20% ethanol+80% NaCl aqueous solution (36% in weight), and iii) NaCl aqueous solution (18% in weight). The microparticles were then dried.

FIG. 12 illustrates comparative microscopic images of the microparticles A) before loading and B) after loading curcumin. Microparticles washed in the solvent (i) before and after loading are shown in FIGS. 12A(i) and 12B(i). Microparticles washed in the solvent (ii) before and after loading are shown in FIGS. 12A(ii) and 12B (ii). Microparticles washed in the solvent (iii) before and after loading are shown in FIGS. 12A(iii) and 12B(iii). FIG. 12C illustrates a comparative UV-Vis spectrum of the microparticles before and after being loaded with curcumin.

EXAMPLE 3

In this study, the same PEO/PCL-MO microparticles were formed as in Example 1. 20 mg of microparticles were immersed in a solution containing 10 mg of folic acid combined with 1 mL ethanol and 9 mL aqueous solution of NaCl (36% in weight). Another 20 mg of microparticles were immersed in a solution containing 10 mg of riboflavin combined with 1 mL ethanol and 9 mL aqueous solution of NaCl (36% in weight). Yet another 20 mg of microparticles were immersed in a solution containing 10 mg of doxorubincin (DOX) combined with 1 mL ethanol and 9 mL aqueous solution of NaCl (36% in weight). In each case, the PCL layers swelled and encapsulated the respective loaded component.

Once the loading phase in each case was complete, the microparticles were filtered by wire mesh and washed in three solvents, namely, i) 5% ethanol+95% NaCl aqueous solution (36% in weight), ii) 20% ethanol+80% NaCl aqueous solution (36% in weight), and iii) NaCl aqueous solution (18% in weight). The microparticles were then dried.

Figure 13A:
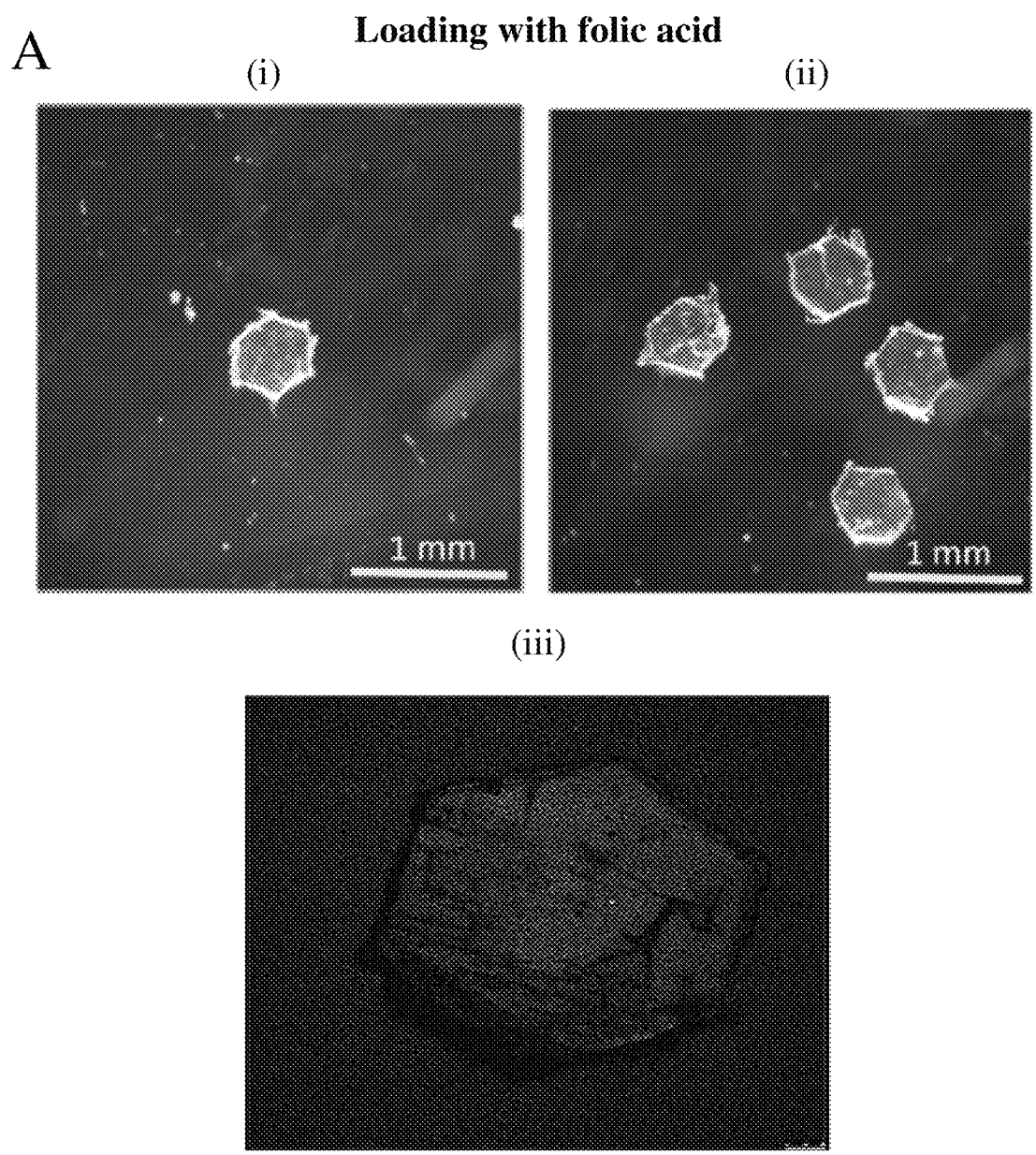
FIGS. 13(A-C) illustrate comparative microscopic images and graph of PEO/PCL-MO microparticles loaded with folic acid and Riboflavin.
Figure 13B:
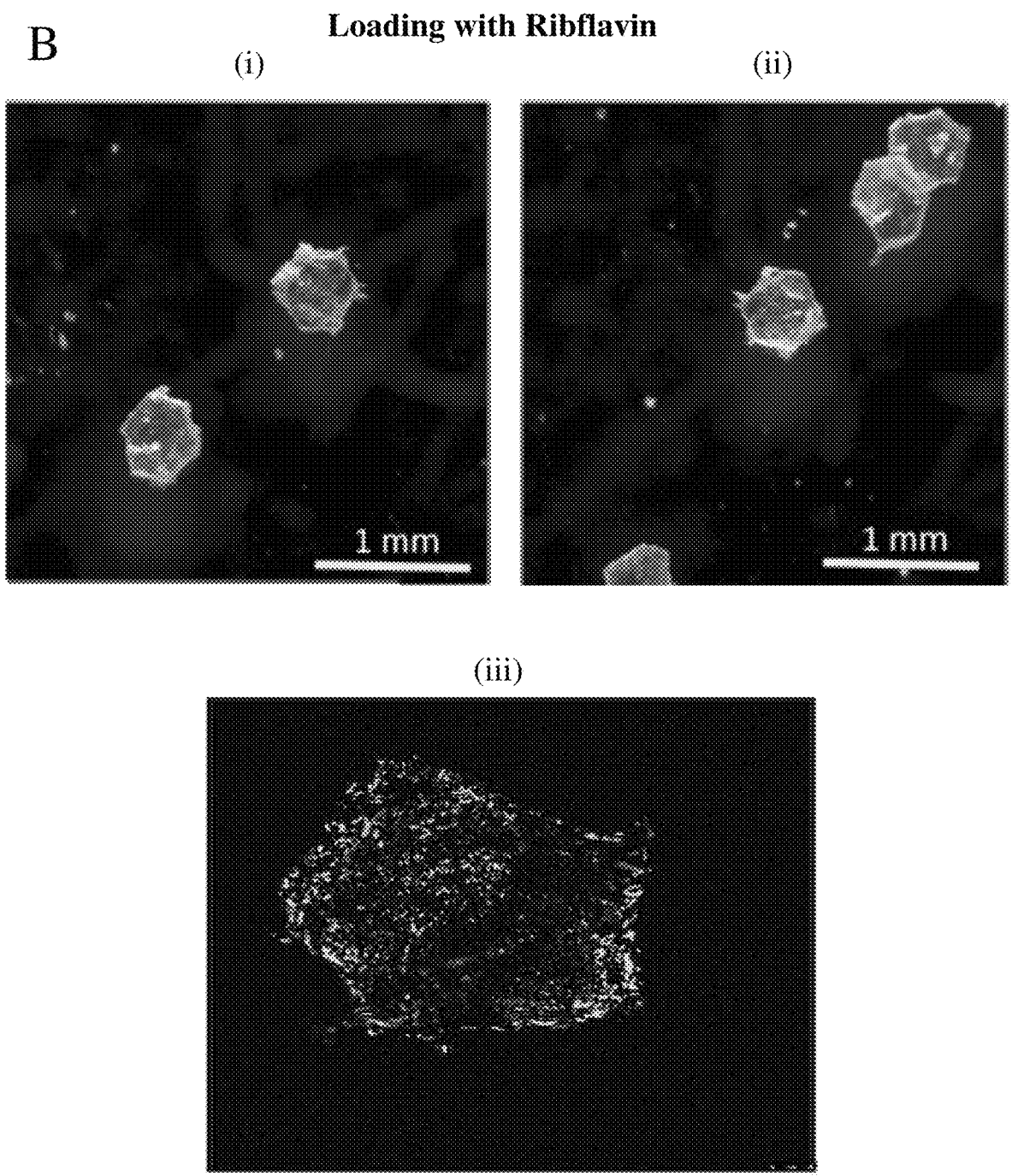
Figure 13C:
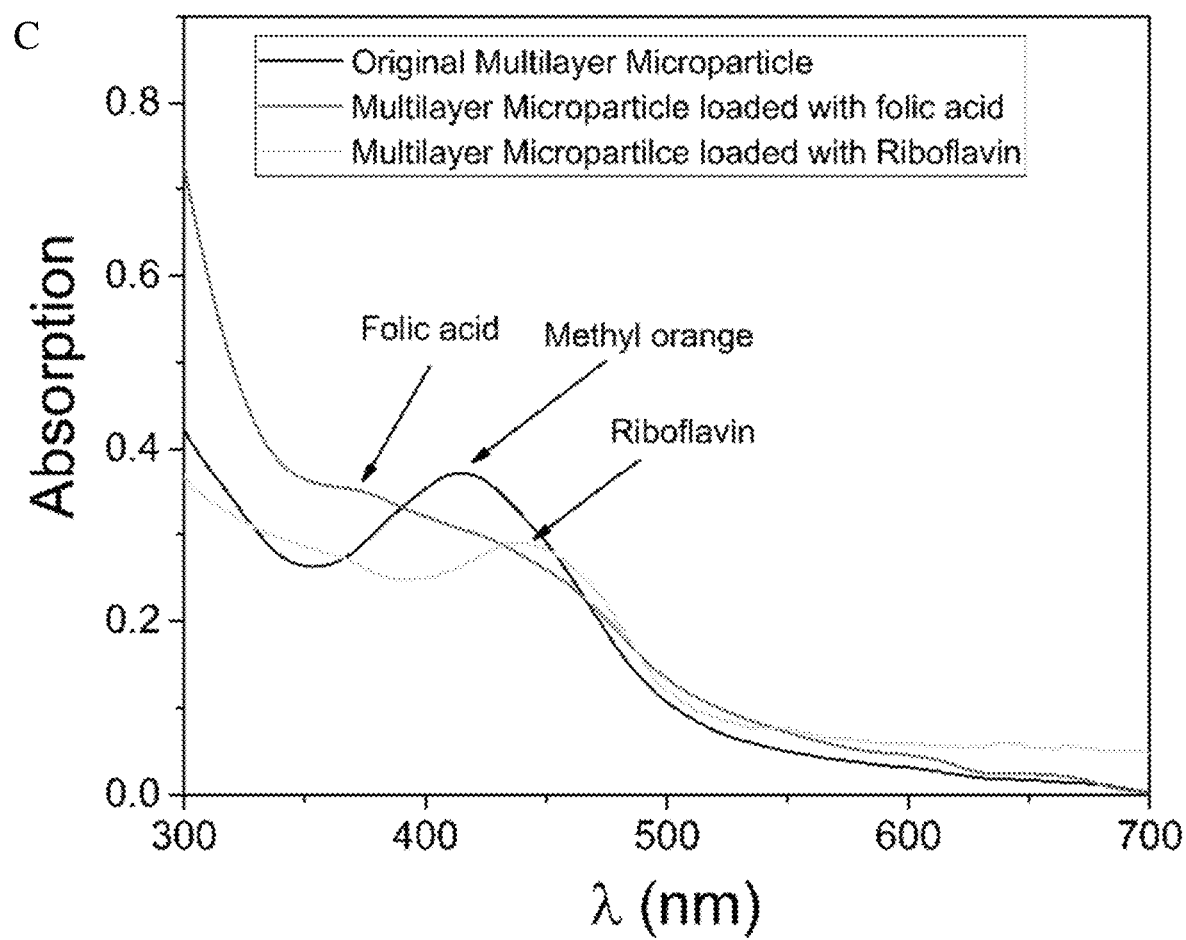

FIG. 13 illustrates comparative microscopic images of the microparticles A) loaded with folic acid, and B) loaded with riboflavin. Microparticles washed in the solvent (i) and loaded with folic acid and Riboflavin are shown in FIGS. 13A(i) and 13B(i). Microparticles washed in the solvent (ii) and loaded with folic acid and Riboflavin are shown in FIGS. 13A(ii) and 13B(ii). Microparticles washed in the solvent (iii) and loaded with folic acid and Riboflavin are shown in FIGS. 13A(iii) and 13B(iii). FIG. 13C illustrates a comparative UV-Vis spectrum of unloaded microparticles as well as microparticles loaded with folic acid and riboflavin.

Figure 14A:
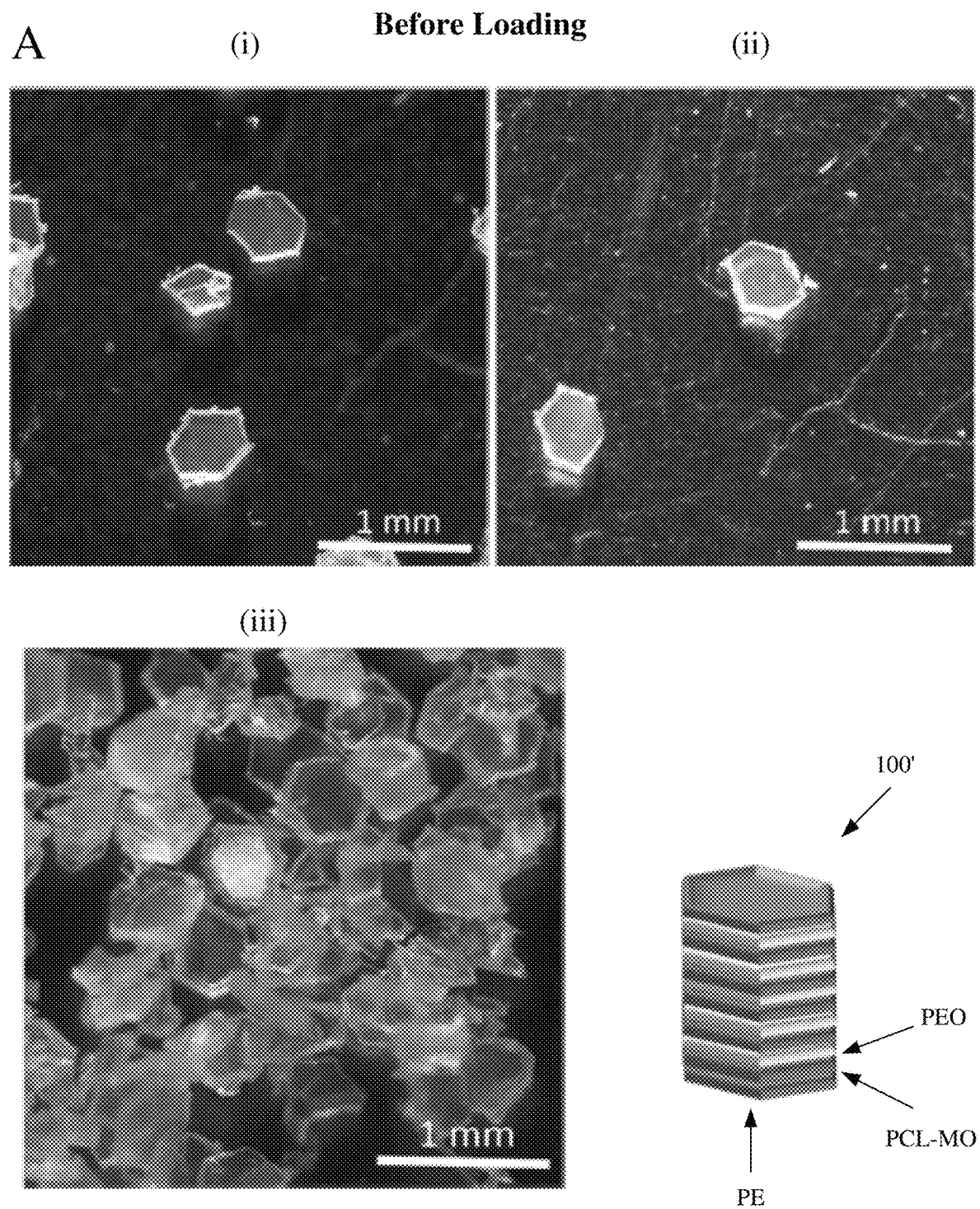
FIGS. 14(A-B) illustrate comparative microscopic images, schematic, and graph of PEO/PCL-MO microparticles are loaded with DOX.
Figure 14B:
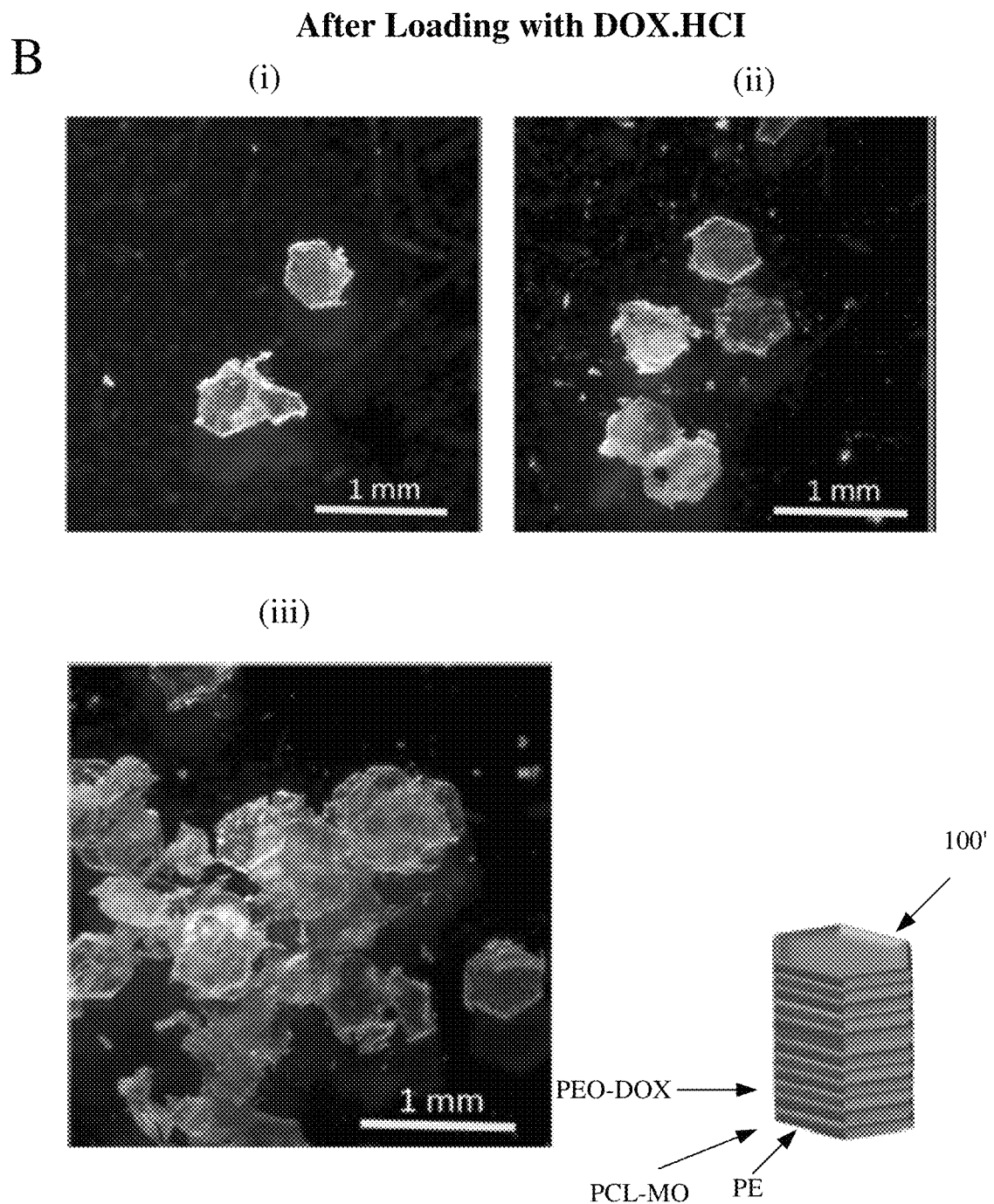
Figure 15A:
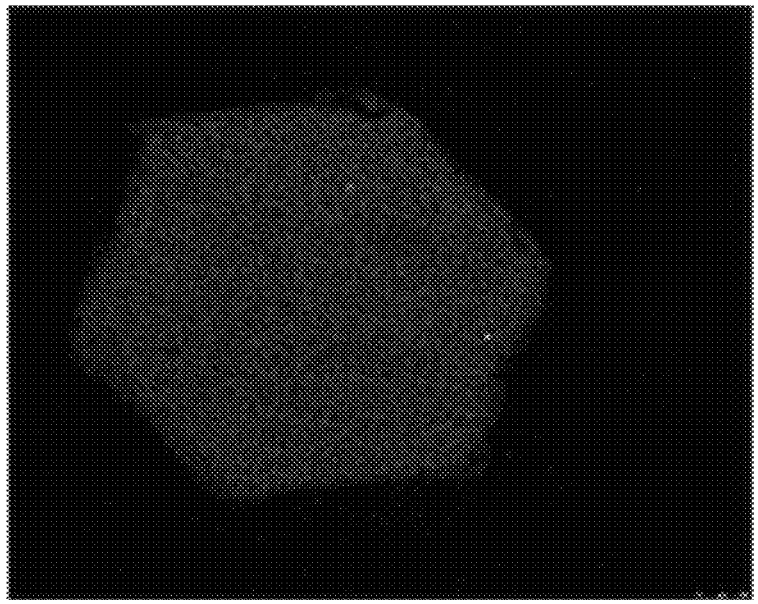
FIGS. 15(A-D) illustrate confocal microscopy images and graph of PEO/PCL-MO microparticles are loaded with DOX.
Figure 15B:
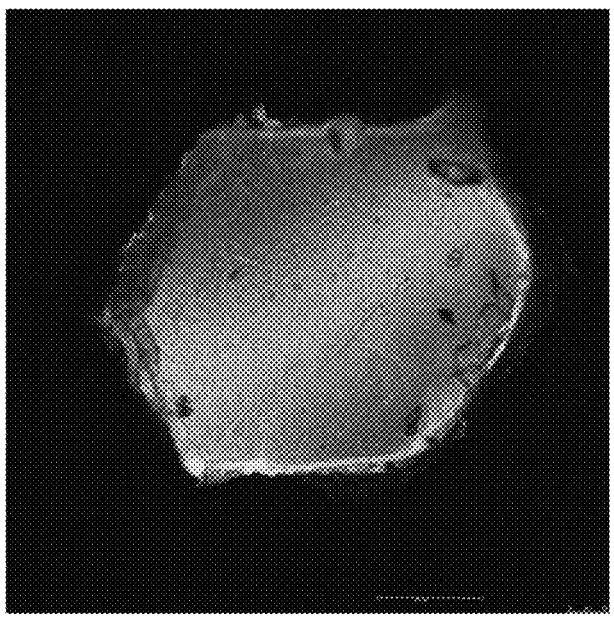
Figure 15C:
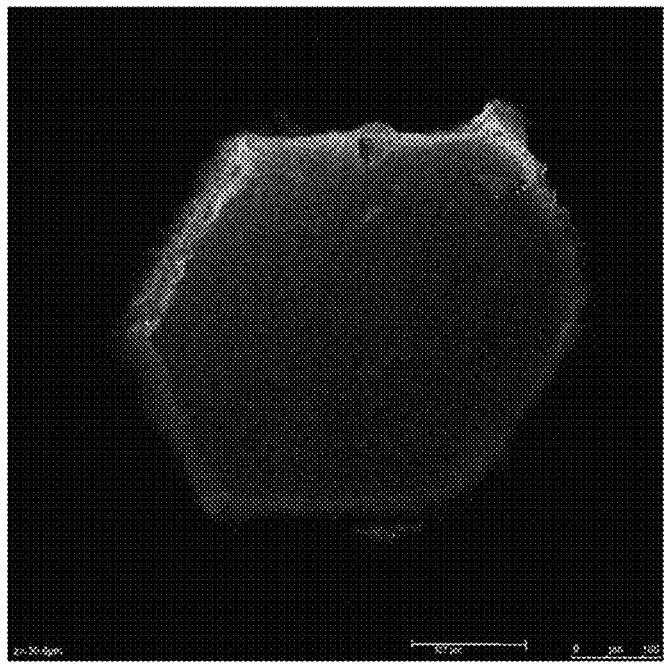
Figure 15D:
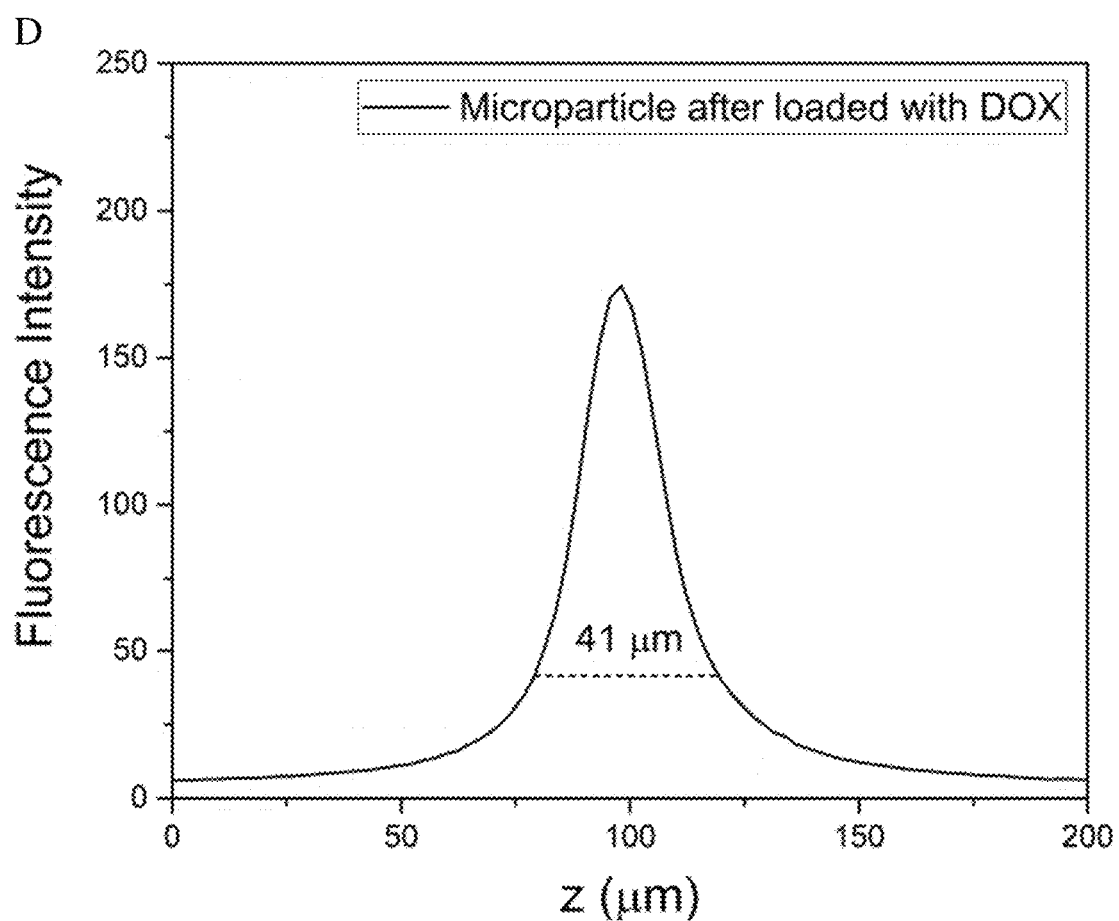

FIG. 14 illustrates comparative microscopic images of the microparticles A) before loading and B) after loading DOX.HCL. Microparticles washed in the solvent (i) before and after loading are shown in FIGS. 14A(i) and 14B(i). Microparticles washed in the solvent (ii) before and after loading are shown in FIGS. 14A(ii) and 14B(ii). Microparticles washed in the solvent (iii) before and after loading are shown in FIGS. 14C(iii) and 14C(iii).

FIG. 15 is a confocal microscopy comparison between the microparticles A) before loading, and B) after loading with DOX. FIG. 15C is a Z-scan of confocal microscopy of the microparticles after loading with DOX. FIG. 15D is a graph illustrating the fluorescence intensity of the microparticles after loading with DOX.

From the above description, those skilled in the art will perceive improvements, changes and modifications. Such improvements, changes and modifications within the skill of the art are intended to be covered by the appended claims. All references, publications, and patents cited in the present application are herein incorporated by reference in their entirety.

We claim:

1. A method of forming particles for controlled guest agent release, comprising:
   coextruding first and second polymer materials to form a multilayer polymer composite sheet comprising alternating first and second polymer layers, the first and second polymer layers being substantially immiscible;
   dividing the multilayer sheet into particles; and
   immersing the particles in a solvent containing the guest agent such that the first polymer layers swell and the second polymer layers are resistant to swelling in the solvent;
   wherein during immersion of the particles, the guest agent diffuses into and/or is loaded into the swollen first polymer layers.

2. The method of claim 1, further comprising drying the swollen first polymer layers such that the swollen first polymer layers reduce in size.

3. The method of claim 1, the step of dividing the multilayer sheet comprises cutting the multilayer sheet into microparticles and/or nanoparticles.

4. The method of claim 3, the microparticles and/or nanoparticles having a size of about 50 nm to about 500 µm wide×about 50 nm to about 500 µm long×about 100 nm to about 150 µm thick.

5. The method of claim 1, wherein the guest agent comprises a thermally unstable therapeutic agent.

6. The method of claim 1, the first polymer material being polyethylene oxide (PEO) and the second polymer material being polycaprolactone (PCL).

7. The method of claim 1, the solvent including NaCl and ethanol.

8. The method of claim 1, further comprising coextruding a skin layer with the first and second polymer layers.

9. The method of claim 8, the skin layer comprising polyethylene (PE).

10. A method of forming a plurality of microparticles and/or nanoparticles for controlled release of a thermally unstable guest agent comprising:
    coextruding first and second polymer materials to form a multilayer polymer composite sheet comprising alternating first and second polymer layers, the first and second polymer layers being substantially immiscible;

mechanically cutting the multilayer sheet into particles; and immersing the particles in a solvent containing the guest agent such that the first polymer layers swell and the second polymer layers are resistant to swelling in the solvent;

wherein during immersion of the particles, the guest agent diffuses into and/or is loaded into the swollen first polymer layers.

11. The method of claim 10, further comprising drying the swollen first polymer layers such that the swollen first polymer layers reduce in size.

12. The method of claim 10, the step of cutting the multilayer sheet comprises cutting the multilayer sheet into microparticles and/or nanoparticles.

13. The method of claim 12, the microparticles having a size of about 50 nm to about 500 μm wide×about 50 nm to about 500 μm long×about 100 nm to about 150 μm thick.

14. The method of claim 10, wherein the guest agent comprises a thermally unstable therapeutic agent.

15. The method of claim 10, the first polymer material being polyethylene oxide (PEO) and the second polymer material being polycaprolactone (PCL).

16. The method of claim 10, the solvent including NaCl and ethanol.

17. The method of claim 10, further comprising coextruding a skin layer with the first and second polymer layers.

18. The method of claim 17, the skin layer comprising polyethylene (PE).

* * * * *